United States Patent
Nishimura et al.

(10) Patent No.: US 8,556,695 B2
(45) Date of Patent: Oct. 15, 2013

(54) INFORMATION STORAGE MEDIUM, IMAGE GENERATION DEVICE, AND IMAGE GENERATION METHOD

(75) Inventors: Norihiro Nishimura, Tokyo (JP); Takehiro Shimizu, Tokyo (JP); Takashi Satsukawa, Yokohama (JP)

(73) Assignee: Namco Bandai Games Inc., Tokyo (JP)

(*) Notice: Subject to any disclaimer, the term of this patent is extended or adjusted under 35 U.S.C. 154(b) by 195 days.

(21) Appl. No.: 13/073,157

(22) Filed: Mar. 28, 2011

(65) Prior Publication Data

US 2011/0244957 A1   Oct. 6, 2011

(30) Foreign Application Priority Data

Mar. 31, 2010 (JP) ................................. 2010-84246

(51) Int. Cl.
- A63F 13/00 (2006.01)
- A63F 9/24 (2006.01)
- G06F 17/00 (2006.01)
- G06F 19/00 (2011.01)

(52) U.S. Cl.
USPC ................................................................ 463/9

(58) Field of Classification Search
USPC ............................................................ 463/9
See application file for complete search history.

(56) References Cited

U.S. PATENT DOCUMENTS

| | | | |
|---|---|---|---|
| 5,853,324 A | 12/1998 | Kami et al. | |
| 6,354,944 B1* | 3/2002 | Takahashi et al. | 463/32 |
| 6,377,264 B1 | 4/2002 | Iizuka et al. | |
| 6,697,068 B2 | 2/2004 | Iizuka et al. | |
| 6,972,756 B1* | 12/2005 | Yamamoto | 345/419 |
| 7,101,283 B2 | 9/2006 | Okamoto et al. | |
| 8,403,753 B2* | 3/2013 | Yoshikawa et al. | 463/37 |

(Continued)

FOREIGN PATENT DOCUMENTS

| | | |
|---|---|---|
| EP | 1097738 A2 * | 5/2001 |
| JP | A-9-225144 | 9/1997 |

(Continued)

OTHER PUBLICATIONS

Wikipedia, "Spawning", http://en.wikipedia.org/w/index.php?title=Spawning_(video_gaming)&oldid=342843445, created Feb. 9, 2010.*

(Continued)

*Primary Examiner* — Omkar Deodhar
*Assistant Examiner* — Reginald Renwick
(74) *Attorney, Agent, or Firm* — Oliff & Berridge, PLC

(57) ABSTRACT

An image generation device includes a movement information calculation section, a virtual camera control section, and a special state transition section The movement information calculation section calculates the position of the player character based on input information. The special state transition section determines the position of the player character based on the position of the player character and a position determination condition that is set corresponding to the special point in the virtual space, and determines whether or not the player character has satisfied the special state transition condition based on the determination result. The virtual camera control section causes setting of at least one of the distance between the player character and a virtual camera, the positional relationship between the player character and the virtual camera, the direction of the virtual camera relative to the player character, and the angle of view of the virtual camera when the player character is in the special state to differ from setting when the player character is not in the special state.

17 Claims, 21 Drawing Sheets

(56) References Cited

U.S. PATENT DOCUMENTS

2006/0040740 A1* 2/2006 DiDato .......................... 463/37
2007/0218966 A1* 9/2007 Tilston et al. ..................... 463/5
2008/0070686 A1* 3/2008 Satsukawa et al. ............. 463/37

FOREIGN PATENT DOCUMENTS

| JP | A-2000-126457 | 5/2000 |
| JP | A-2001-276420 | 10/2001 |
| JP | B2-3538285 | 3/2004 |

OTHER PUBLICATIONS

Wikipedia, "Camping", http://en.wikipedia.org/w/index.php?title=Camping_(gaming)&oldid=334702974, created Dec. 29, 2009.*

Giant Bomb, "Walk Hacking," http://www.giantbomb.com/wallhack/92-19/. Created Sep. 28, 2008.*

* cited by examiner

FIG.3

| SPECIAL POINT ID 311 | COLLISION INFORMATION 312 | DIRECTION CONDITION 313 | SPECIAL POINT POSITION INFORMATION 314 | SPECIAL STATE DIRECTION INFORMATION 315 | ATTACK PATTERN IDENTIFICATION INFORMATION 316 | PRIORITY ORDER 317 |
|---|---|---|---|---|---|---|
| TP1 | CO1 | va1~vb1 | (x_1, y_1, z_1) | (θx_1, θy_1, θz_1) | ap1 | pr1 |
| TP2 | CO2 | va2~vb2 | (x_2, y_2, z_2) | (θx_2, θy_2, θz_2) | ap2 | pr2 |
| TP3 | CO3 | va3~vb3 | (x_3, y_3, z_3) | (θx_3, θy_3, θz_3) | ap3 | pr3 |
| ... | ... | ... | ... | ... | ... | ... |

FIG.18

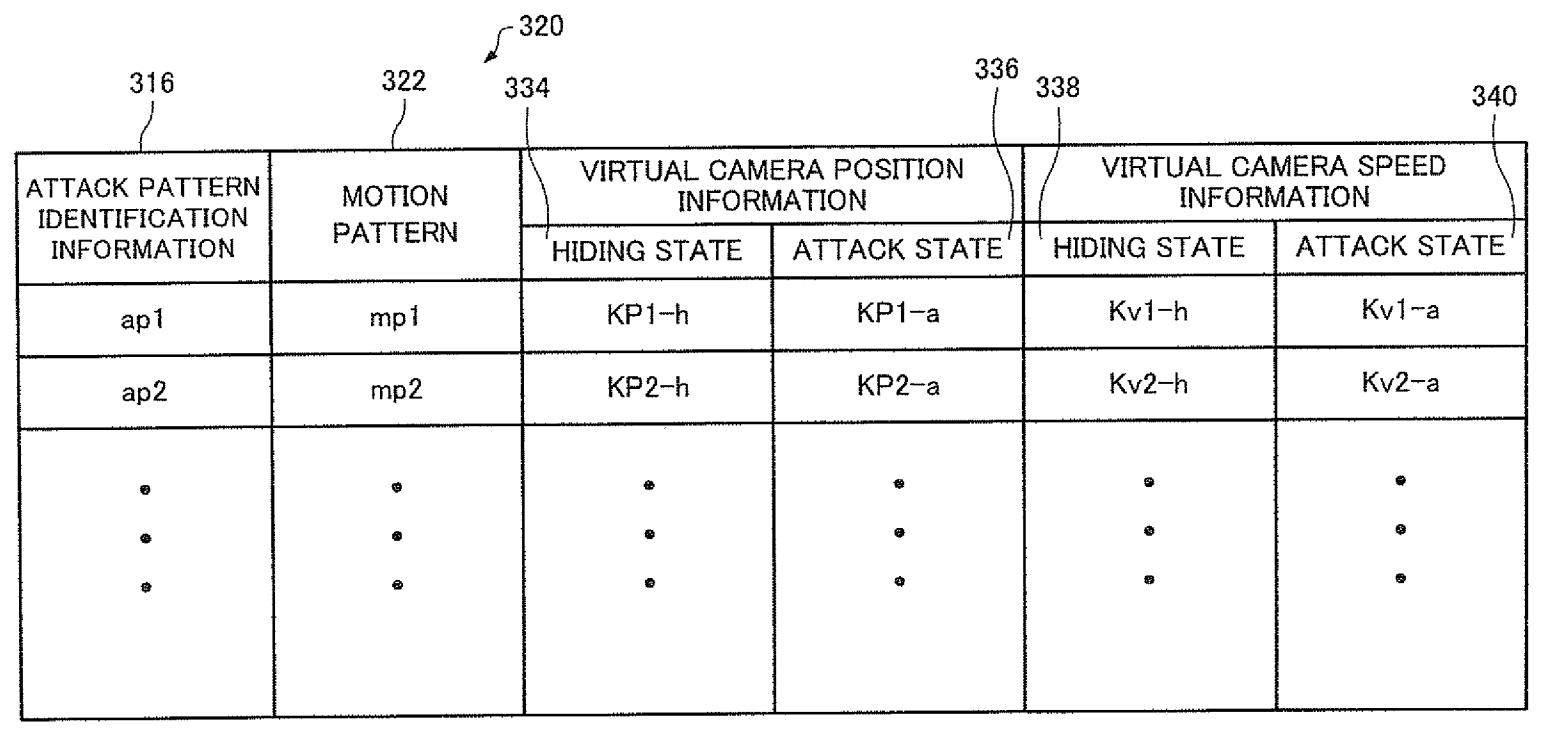

| ATTACK PATTERN IDENTIFICATION INFORMATION | MOTION PATTERN | VIRTUAL CAMERA POSITION INFORMATION | | VIRTUAL CAMERA SPEED INFORMATION | |
|---|---|---|---|---|---|
| | | HIDING STATE | ATTACK STATE | HIDING STATE | ATTACK STATE |
| ap1 | mp1 | KP1-h | KP1-a | Kv1-h | Kv1-a |
| ap2 | mp2 | KP2-h | KP2-a | Kv2-h | Kv2-a |
| ⋯ | ⋯ | ⋯ | ⋯ | ⋯ | ⋯ |

INFORMATION STORAGE MEDIUM, IMAGE GENERATION DEVICE, AND IMAGE GENERATION METHOD

Japanese Patent Application No. 2010-84246 filed on Mar. 31, 2010, is hereby incorporated by reference in its entirety.

BACKGROUND OF THE INVENTION

The present invention relates to an information storage medium, an image generation device, and an image generation method.

An image generation device (game system) that generates an image viewed from a virtual camera (given viewpoint) in an object space (virtual three-dimensional space) (where an object (e.g., character) is disposed) has been known, and is very popular as a means that allows the player to experience virtual reality.

An image generation device that generates a shooting game image has been known. For example, the player fires a bullet at an enemy character in the object space (three-dimensional space) using an input section. Japanese Patent No. 3538285 discloses related-art technology, for example.

A shooting game that allows a player character that hides itself behind a wall or the like to attack an enemy character is very popular.

A game system that allows the player to arbitrarily move the player character in the game space based on an operation input by the player is also popular. However, when the player can arbitrarily move the player character in the virtual space based on an operation input, it is difficult to establish a situation in which the player character hides itself behind a wall or the like.

SUMMARY

According to a first aspect of the invention, there is provided a non-transitory computer-readable information storage medium storing a program that generates an image of a game that moves a player character in a virtual space, the program causing a computer to function as:

a movement information calculation section that calculates movement information about the player character in the virtual space based on input information;

a special state transition section that determines whether or not the player character has satisfied a special state transition condition based on the movement information about the player character, and causes the player character to transition to a special state and move to a special point set in the virtual space when the special state transition section has determined that the player character has satisfied the special state transition condition;

a virtual camera control section that disposes a virtual camera based on at least one of the input information and the movement information about the player character; and an image generation section that generates an image of the virtual space viewed from the virtual camera, the movement information calculation section calculating a position of the player character based on the input information;

the special state transition section determining the position of the player character based on the position of the player character and a position determination condition that is set corresponding to the special point in the virtual space, and determining whether or not the player character has satisfied the special state transition condition based on the determination result; and the virtual camera control section causing setting of at least one of a distance between the player character and the virtual camera, a positional relationship between the player character and the virtual camera, a direction of the virtual camera relative to the player character, and an angle of view of the virtual camera when the player character is in the special state to differ from setting when the player character is not in the special state.

According to a second aspect of the invention, there is provided an image generation device that generates an image of a game that moves a player character in a virtual space, the image generation device including:

a movement information calculation section that calculates movement information about the player character in the virtual space based on input information;

a special state transition section that determines whether or not the player character has satisfied a special state transition condition based on the movement information about the player character, and causes the player character to transition to a special state and move to a special point set in the virtual space when the special state transition section has determined that the player character has satisfied the special state transition condition;

a virtual camera control section that disposes a virtual camera based on at least one of the input information and the movement information about the player character; and an image generation section that generates an image of the virtual space viewed from the virtual camera, the movement information calculation section calculating a position of the player character based on the input information;

the special state transition section determining the position of the player character based on the position of the player character and a position determination condition that is set corresponding to the special point in the virtual space, and determining whether or not the player character has satisfied the special state transition condition based on the determination result; and the virtual camera control section causing setting of at least one of a distance between the player character and the virtual camera, a positional relationship between the player character and the virtual camera, a direction of the virtual camera relative to the player character, and an angle of view of the virtual camera when the player character is in the special state to differ from setting when the player character is not in the special state.

According to a third aspect of the invention, there is provided an image generation method that generates an image of a game that moves a player character in a virtual space using a computer, the image generation method including:

a movement information calculation step that calculates movement information about the player character in the virtual space based on input information;

a special state transition step that determines whether or not the player character has satisfied a special state transition condition based on the movement information about the player character, and causes the player character to transition to a special state and move to a special point set in the virtual space when it has been determined that the player character has satisfied the special state transition condition;

a virtual camera control step that disposes a virtual camera based on at least one of the input information and the movement information about the player character; and an image generation step that generates an image of the virtual space viewed from the virtual camera, the movement information calculation step calculating a position of the player character based on the input information;

the special state transition step determining the position of the player character based on the position of the player character and a position determination condition that is set corresponding to the special point in the virtual space, and determining whether or not the player character has satisfied the special state transition condition based on the determination result; and the virtual camera control step causing setting of at least one of a distance between the player character and the virtual camera, a positional relationship between the player character and the virtual camera, a direction of the virtual camera relative to the player character, and an angle of view of the virtual camera when the player character is in the special state to differ from setting when the player character is not in the special state.

BRIEF DESCRIPTION OF THE SEVERAL VIEWS OF THE DRAWING

FIG. 3 is a table illustrating special point setting information linked to each special point.

FIG. 18 is a table illustrating attack pattern setting information.

DETAILED DESCRIPTION OF THE EMBODIMENT

Figure 1:
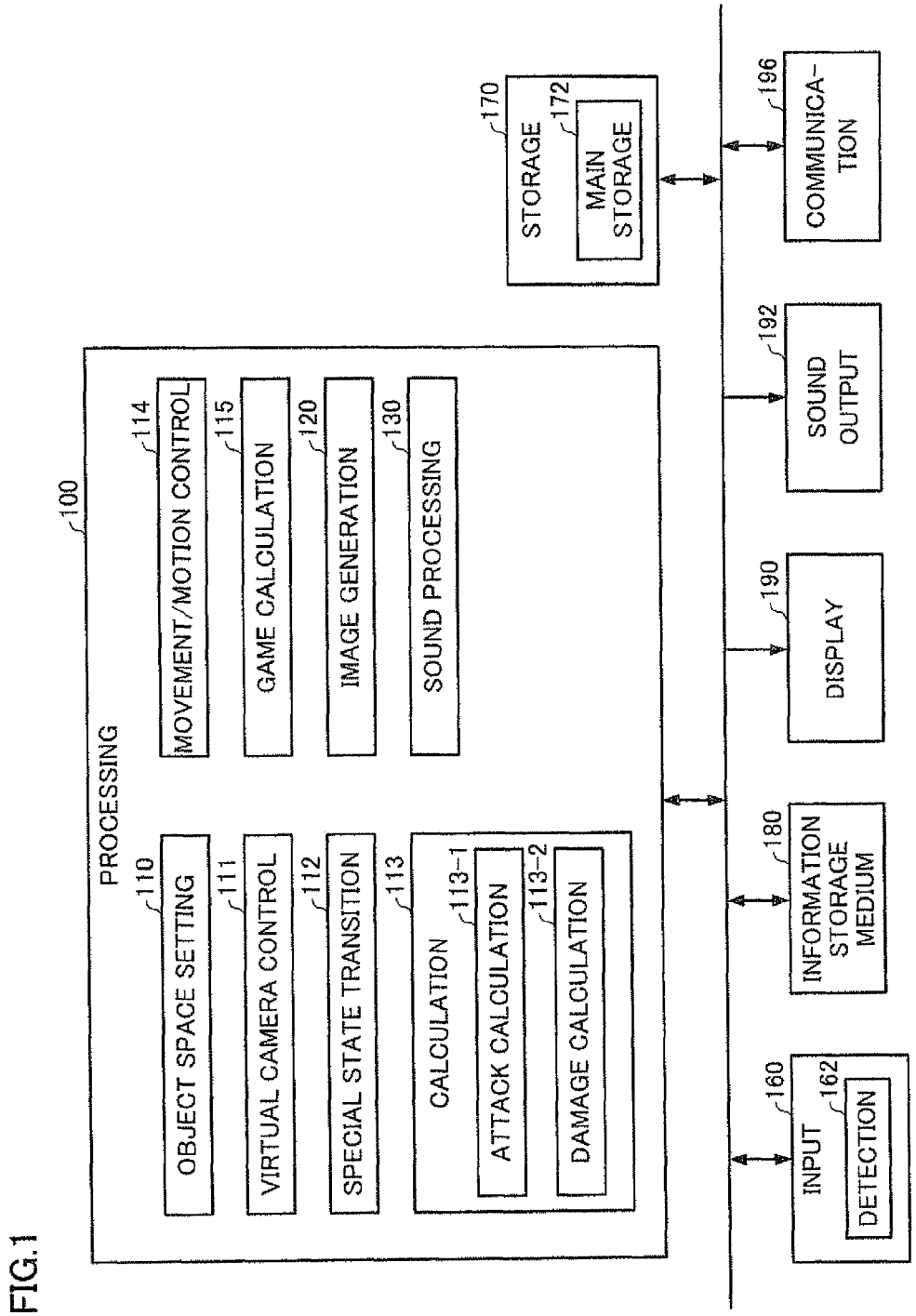
FIG. 1 is a functional block diagram illustrating an image generation device according to one embodiment of the invention.

The invention may provide an image generation device that generates an image of a game that allows the player to arbitrarily move a player character in a virtual space based on input information, and implements a state in which the player character moves to an advantageous special point, and the player can enjoy the game using the player character positioned at the special point.

(1) One embodiment of the invention relates to a non-transitory computer-readable information storage medium storing a program that generates an image of a game that moves a player character in a virtual space, the program causing a computer to function as:

a movement information calculation section that calculates movement information about the player character in the virtual space based on input information;

a special state transition section that determines whether or not the player character has satisfied a special state transition condition based on the movement information about the player character, and causes the player character to transition to a special state and move to a special point set in the virtual space when the special state transition section has determined that the player character has satisfied the special state transition condition;

a virtual camera control section that disposes a virtual camera based on at least one of the input information and the movement information about the player character; and an image generation section that generates an image of the virtual space viewed from the virtual camera, the movement information calculation section calculating a position of the player character based on the input information;

the special state transition section determining the position of the player character based on the position of the player character and a position determination condition that is set corresponding to the special point in the virtual space, and determining whether or not the player character has satisfied the special state transition condition based on the determination result; and the virtual camera control section causing setting of at least one of a distance between the player character and the virtual camera, a positional relationship between the player character and the virtual camera, a direction of the virtual camera relative to the player character, and an angle of view of the virtual camera when the player character is in the special state to differ from setting when the player character is not in the special state.

Another embodiment of the invention relates to an image generation device that includes the above sections.

Another embodiment of the invention relates to an image generation method that generates an image by causing a computer to execute the process of each of the above sections.

The special point may a position (e.g., a position where the player character is not easily attacked by an enemy, or a position where the player character is enclosed by an object that blocks attack by an enemy) that is advantageous during a battle in the virtual space.

The player character that is set in the special state (positioned at the special point) may be given an advantageous condition during the game.

The above embodiments may be applied to a case where a first person viewpoint image is generated (first person shooting (FPS)) and a case where a third person viewpoint image is generated (third person shooting (TPS)). The player character may be arbitrarily moved in the virtual space based on the input information. The virtual camera may follow the player character. In this case, the virtual camera may be moved or disposed based on the input information for moving the player character.

The input information may be the moving direction (e.g., forward, backward, rightward, or leftward direction), the moving speed, the direction (rotation), or the like of the player character (virtual camera).

Note that whether or not the player character has satisfied the special state transition condition may be determined when the player has performed a special state transition instruction input. Specifically, the player character may not be caused to transition to the special state even if the player character has satisfied the special state transition condition when the player has not performed a special state transition instruction input. The player character that has transitioned to the special state is set in the special state until the special state is cancelled.

When controlling the position and the direction of the virtual camera instead of the position and the direction of the player character, or when the position and the direction of the player character are synchronized with the position and the direction of the virtual camera, the position of the player character may be determined based on the position of the special point and the position of the virtual camera in the virtual space, and whether or not the player character has satisfied the special state transition condition may be determined based on the determination result.

At least one of the distance between the player character and the virtual camera, the positional relationship between the player character and the virtual camera, the direction of the virtual camera relative to the player character, and the angle of view of the virtual camera may be caused to differ from that when the player character is set in the normal state when the player character has been set in the special state (particularly the attack state).

The position and the direction of the virtual camera may be changed when the player character is set in the attack state of the special state, so that the player can easily attack an enemy.

According to the above embodiments, it is possible to generate an image that allows the player to easily observe an enemy when the player character is set in the special state.

It is also possible to provide an image generation device that generates an image of a game that allows the player to arbitrarily move the player character in the virtual space based on the input information, and implements a state in which the player character moves to an advantageous special point, and the player can enjoy the game using the player character positioned at the special point.

(2) In each of the above information storage medium and image generation device, the special state transition section may switch the state of the player character between a hiding state and an attack state based on the input information when the player character is in the special state; and the virtual camera control section may cause setting of at least one of the distance between the player character and the virtual camera, the positional relationship between the player character and the virtual camera, the direction of the virtual camera relative to the player character, and the angle of view of the virtual camera when the player character is in the attack state to differ from setting when the player character is in the hiding state.

In the above image generation method, the special state transition step may switch the state of the player character between a hiding state and an attack state based on the input information when the player character is in the special state; and the virtual camera control step may cause setting of at least one of the distance between the player character and the virtual camera, the positional relationship between the player character and the virtual camera, the direction of the virtual camera relative to the player character, and the angle of view of the virtual camera when the player character is in the attack state to differ from setting when the player character is in the hiding state.

This makes it possible to generate an image that allows the player to easily observe an enemy when the player character is set in the attack state of the special state.

(3) In the above information storage medium, the program may cause the computer to further function as:

an attack calculation section that determines an attack start position, and calculates a trajectory of a missile from the attack start position; and the attack calculation section may determine the attack start position based on the position of the player character in a normal state, and may determine the attack start position based on the position of the virtual camera in the attack state of the special state.

The above image generation device may further comprise an attack calculation section that determines an attack start position, and calculates a trajectory of a missile from the attack start position; and the attack calculation section may determine the attack start position based on the position of the player character in a normal state, and may determine the attack start position based on the position of the virtual camera in the attack state of the special state.

The above image generation method may further comprise an attack calculation step that determines an attack start position, and calculates a trajectory of a missile from the attack start position; and the attack calculation step may determine the attack start position based on the position of the player character in a normal state, and may determine the attack start position based on the position of the virtual camera in the attack state of the special state.

The term "missile" refers to a bullet, an arrow, a bomb, or the like.

In the above information storage medium, the program may cause the computer to further function as:

a damage calculation section that calculates damage applied to the player character based on attack information; and the damage calculation section may perform a hit check of the player character based on the position of the player character instead of the position of the virtual camera even when the player character is in the special state.

The above image generation device may further comprise a damage calculation section that calculates damage applied to the player character based on attack information; and the damage calculation section may perform a hit check of the player character based on the position of the player character instead of the position of the virtual camera even when the player character is in the special state.

The above image generation method may further comprise a damage calculation step that calculates damage applied to the player character based on attack information; and the damage calculation step may perform a hit check of the player character based on the position of the player character instead of the position of the virtual camera even when the player character is in the special state.

(4) In each of the above information storage medium and image generation device, the virtual camera control section may change at least one of the distance between the player character and the virtual camera, the positional relationship between the player character and the virtual camera, the direction of the virtual camera relative to the player character, and the angle of view of the virtual camera based on at least one of an attribute, a posture, a motion type used for motion control, and an item type of the player character when the player character is in the special state or the attack state of the special state.

In the above image generation method, the virtual camera control step may change at least one of the distance between the player character and the virtual camera, the positional relationship between the player character and the virtual camera, the direction of the virtual camera relative to the player character, and the angle of view of the virtual camera based on at least one of an attribute, a posture, a motion type used for motion control, and an item type of the player character when the player character is in the special state or the attack state of the special state.

(5) In each of the above information storage medium and image generation device, the special state transition section may set a parameter used for game calculations to a value advantageous or disadvantageous for the player character when the player character is in the special state, as compared with a case where the player character is not in the special state.

In the above image generation method, the special state transition step may set a parameter used for game calculations to a value advantageous or disadvantageous for the player character when the player character is in the special state, as compared with a case where the player character is not in the special state.

For example, when the player character is positioned at the special point, the parameter (e.g., attack, defense, damage level, recovery, life, and hit score) may be set to a value advantageous for the player character as compared with the normal state.

This makes it possible to prompt the player to move the player character to the special point.

(6) In each of the above information storage medium and image generation device, the movement information calculation section may calculate a posture of the player character or whether or not the player character is positioned directly on the ground, based on at least one of the input information and posture information; and the special state transition section may determine whether or not the player character has satisfied the special state transition condition based on the posture of the player character or whether or not the player character is positioned directly on the ground.

In the above image generation method, the movement information calculation step may calculate a posture of the player character or whether or not the player character is positioned directly on the ground, based on at least one of the input information and posture information; and the special state transition step may determine whether or not the player character has satisfied the special state transition condition based on the posture of the player character or whether or not the player character is positioned directly on the ground.

Whether or not the player character is positioned directly on the ground may be determined by calculating the position coordinates (X, Y, Z) of the player character based on the input information, and determining whether or not the calculated position coordinates correspond to the ground (not in the air) based on topographical information (map). Alternatively, whether or not the player character is positioned directly on the ground may be determined by determining whether or not the player character is in a predetermined state (e.g., jump state) based on the input information.

(7) In each of the above information storage medium and image generation device, the special state transition section may generate drawing control information for drawing an object that blocks the view of the player character in a translucent state when the player character is in the special state; and the image generation section may generate an image of the virtual space in which an object that blocks the view of the player character is displayed in a translucent state based on the drawing control information.

In the above image generation method, the special state transition step may generate drawing control information for drawing an object that blocks the view of the player character in a translucent state when the player character is in the special state; and the image generation step may generate an image of the virtual space in which an object that blocks the view of the player character is displayed in a translucent state based on the drawing control information.

(8) In each of the above information storage medium and image generation device, the special state transition section may generate image generation control information for generating an image in which a notification image that indicates the presence of a predetermined object is disposed in the image of the virtual space at a position corresponding to the object; and the image generation section may blend the image of the virtual space with the notification image based on the image generation control information to generate the image of the virtual space including the notification image.

In the above image generation method, the special state transition step may generate image generation control information for generating an image in which a notification image that indicates the presence of a predetermined object is disposed in the image of the virtual space at a position corresponding to the object; and the image generation step may blend the image of the virtual space with the notification image based on the image generation control information to generate the image of the virtual space including the notification image.

The position corresponding to the object in the image of the virtual space may be a position determined based on the projection position of the object in a screen plane.

(9) In each of the above information storage medium and image generation device, the special state transition section may determine a special point to which the player character is moved based on a distance between the player character and each of a plurality of special points when the player character has satisfied the special state transition condition for a plurality of special points in the virtual space.

In the above image generation method, the special state transition step may determine a special point to which the player character is moved based on a distance between the player character and each of a plurality of special points when the player character has satisfied the special state transition condition for a plurality of special points in the virtual space.

For example, when determining the position of the player character by performing a hit check with a collision area (hit area) that is set corresponding to the special point, the collision areas (hit area) set corresponding to a plurality of special points may overlap, and the player character may come in contact with the overlapping area. In this case, the player character has satisfied the special state transition condition for a plurality of special points in the virtual space.

(10) In each of the above information storage medium and image generation device, the special state transition section may determine whether or not the player character has satisfied the special state transition condition based on at least one of a determination result as to whether or not a position of the player character has continuously satisfied a position condition for a predetermined time, a determination result as to whether or not a direction of the player character has continuously satisfied a direction condition for a predetermined time, and a determination result as to whether or not a moving direction of the player character has continuously satisfied a moving direction condition for a predetermined time.

In the above image generation method, the special state transition step may determine whether or not the player character has satisfied the special state transition condition based on at least one of a determination result as to whether or not a position of the player character has continuously satisfied a position condition for a predetermined time, a determination result as to whether or not a direction of the player character has continuously satisfied a direction condition for a predetermined time, and a determination result as to whether or not a moving direction of the player character has continuously satisfied a moving direction condition for a predetermined time.

For example, when determining the position of the player character by performing a hit check with a hit area that is set corresponding to the special point, whether or not the player character has satisfied the special state transition condition may be determined based on the time for which the player character has hit the hit area. It may be determined that the player character has satisfied the special state transition condition when the player character has hit the hit area set corresponding to the special point for a predetermined time.

(11) In each of the above information storage medium and image generation device, the special state transition section may cancel the special state of the player character when at least one of a position and a direction of the player character has changed based on the input information, and satisfied a special state cancellation condition.

In the above image generation method, the special state transition step may cancel the special state of the player character when at least one of a position and a direction of the player character has changed based on the input information, and satisfied a special state cancellation condition.

When controlling the position and the direction of the virtual camera instead of the position and the direction of the player character, or the position and the direction of the player character are synchronized with the position and the direction of the virtual camera, the player character may be caused to transition from the special state to the normal state when at least one of the position and the direction of the virtual camera has satisfied the special state cancellation condition.

(12) In each of the above information storage medium and image generation device, the special state transition section may determine whether or not at least one of a time elapsed after the player character has transitioned to the special state and a predetermined parameter of the player character has satisfied a special state cancellation condition, and may cancel the special state of the player character when the special state transition section has determined that the special state cancellation condition has been satisfied.

In the above image generation method, the special state transition step may determine whether or not at least one of a time elapsed after the player character has transitioned to the special state and a predetermined parameter of the player character has satisfied a special state cancellation condition, and may cancel the special state of the player character when the special state transition section has determined that the special state cancellation condition has been satisfied.

(13) In each of the above information storage medium and image generation device, the virtual camera control section may reduce a rotation speed of the virtual camera that is synchronized with the player character when an operation input that changes a direction of the player character has been performed in the special state, as compared with a case where the player character is not in the special state.

In the above image generation method, the virtual camera control step may reduce a rotation speed of the virtual camera that is synchronized with the player character when an operation input that changes a direction of the player character has been performed in the special state, as compared with a case where the player character is not in the special state.

(14) In the above information storage medium, the program may be executed by a game machine connected to another game machine or a server via a network, and may cause the computer to further function as a game data communication processing section that transmits game data to and receives game data from the other game machine or the server;

the game data communication processing section may receive game data including special state transition information about a player character of the other game machine, and may transmit game data including special state transition information about the player character of the game machine; and the special state transition section may move the player character of the game machine to a given special point when the player character of the game machine has satisfied the special state transition condition for the given special point, and may move the player character of the game machine that is positioned at the special point to a position other than the special point when the special state transition section has determined that game data special state transition information about the player character of the other game machine and game data special state transition information about the player character of the game machine have an exclusive relationship, and the player character of the game machine has transitioned to the special state later than the player character of the other game machine after the player character of the game machine has moved to the special point.

The special state transition information may be information about the transition time or the special point to which the player character has moved, for example.

When only one player character can be moved to one special point, the exclusive relationship is satisfied when the special state transition condition has been satisfied for an identical special point in a plurality of game machines, for example.

Whether or not the exclusive relationship is satisfied may be determined by each game machine, or may be determined by a host machine or a server, and each game machine may receive the determination result from the host machine or the server. The host machine or the server may perform the exclusive control process, and each game machine may output an image based on the result of the exclusive control process.

(15) In the above information storage medium, the special state transition section may move the player character of the game machine to a position other than the special point when the player character of the other game machine and the player character of the game machine have satisfied the special state transition condition for an identical special point, or have satisfied the special state transition condition for special points belonging to an identical group, or have satisfied the special state transition condition for special points having an exclusive relationship.

(16) In the above information storage medium, the special state transition section may move the player character of the game machine to a substitution special point set corresponding to the special point at which the player character of the game machine is positioned, and may cause the player character of the game machine to transition from a normal state to the special state when the player character of the other game machine and the player character of the game machine have an exclusive relationship, and the player character of the game machine has transitioned to the special state later than the player character of the other game machine.

Exemplary embodiments of the invention are described below. Note that the following embodiments do not unduly limit the scope of the invention as stated in the claims. Note also that all of the elements described below should not necessarily be taken as essential elements of the invention.

1. Configuration

FIG. 1 illustrates an example of a functional block diagram of an image generation device (computer, terminal, or game machine) according to one embodiment of the invention. Note that the image generation system according to this embodiment may have a configuration in which some of the elements (sections) illustrated in FIG. 1 are omitted.

An input section 160 allows the player to input information, and outputs the information input by the player to a processing section. The input section 160 includes a detection section 162 that detects the information (input signal) input by the player. The input section 160 may include a lever, a button, a steering wheel, a microphone, a touch panel display, or the like.

The input section 160 may be an input device that includes an acceleration sensor that detects three-axis accelerations, a gyrosensor that detects angular velocity, and an imaging section. For example, the input device may be held or worn by the player. The term "input device" includes a controller that imitates a tool such as a sword-type controller or a gun-type controller that is held by the player, or a glove-type controller that is worn by the player. The term "input device" also includes an image generation device, a portable image generation device, a mobile phone, and the like that are integrated with the input device.

The detection section 162 detects input information from the input section 160. For example, the detection section 162 detects an input signal generated when a trigger of the input section 160 has been pulled as the input information (attack input information). The detection section 162 also detects input information (instruction input information) that instructs the position of a gun sight from the input section 160.

For example, when the input section 160 is a touch panel display in which a liquid crystal display and a touch panel for detecting the touch position of the player are stacked, the input section 160 detects touch position information about an input device (e.g., touch pen) or a fingertip as the input information.

When the input section 160 is an input device that includes an imaging section, the input section 160 detects indication position information about a captured image as the input information. In this case, the imaging section includes an infrared filter, a lens, an imaging element (image sensor), and an image processing circuit. The infrared filter is disposed on the front side of the input device, and allows only infrared radiation contained in light incident from a light source (two light sources) disposed in connection with the display section 190 to pass through. The lens condenses the infrared radiation that has passed through the infrared filter, and emits the focused infrared radiation to the imaging element. The imaging element is a solid-state imaging element such as a CMOS sensor or a CCD. The imaging element captured the infrared radiation condensed by the lens to generate a captured image. The captured image generated by the imaging element is processed by the image processing circuit. For example, the input device that includes the imaging section processes the captured image generated by the imaging device to detect a high-luminance component, and detects light source position information (indication position information) in the captured image as the input information.

A storage section 170 serves as a work area for a processing section 100, a communication section 196, and the like. The function of the storage section 170 may be implemented by a RAM, a VRAM, or the like.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like. The processing section 100 performs various processes according to this embodiment based on a program (data) stored in the information storage medium 180. A program that causes a computer to function as each section according to this embodiment (i.e., a program that causes a computer to execute the process of each section) may be stored in the information storage medium 180.

A display section 190 outputs an image generated according to this embodiment. The function of the display section 190 may be implemented by a CRT, an LCD, a touch panel display, a head mount display (HMD), or the like. A sound output section 192 outputs sound generated according to this embodiment. The function of the sound output section 192 may be implemented by a speaker, a headphone, or the like.

The communication section 196 controls communication with the outside (e.g., another image generation device). The function of the communication section 196 may be implemented by hardware such as a processor or a communication ASIC, a program, or the like.

Note that the image generation device may receive a program (data) that causes a computer to function as each section according to this embodiment from an information storage medium or a storage section included in a server via a network, and may store the received program (data) in the information storage medium 180 or the storage section 170. A case where the image generation device operates based on the program and data received from the server is also included within the scope of the invention.

The processing section 100 (processor) performs a game process, an image generation process, a sound generation process, and the like based on information input from the input section 160, a program, and the like.

The processing section 100 performs various processes using a main storage section 172 of the storage section 170 as a work area. The function of the processing section 100 may be implemented by hardware such as a processor (e.g., CPU, GPU, or DSP) or an ASIC (e.g., gate array), or may be implemented by a program.

The processing section 100 includes an object space setting section 110, a virtual camera control section 111, a special state transition section 112, a calculation section 113 (including an attack calculation section 113-1 and a damage calculation section 113-2), a movement/motion processing section 114, a game calculation section 115, an image generation section (drawing section) 120, and a sound processing section 130. The processing section 100 may have a configuration in which some of these sections are omitted.

The object space setting section 110 disposes a display object (e.g., character (enemy object), building, stadium, car, tree, pillar, wall, or map (topography)) in an object space.

The term "object space" refers to a virtual game space, and includes a two-dimensional space and a three-dimensional space. The two-dimensional space is a space in which the object is disposed at two-dimensional coordinates (X,Y), and the three-dimensional space is a space in which the object is disposed at three-dimensional coordinates (X, Y, Z), for example.

For example, the object space setting section 110 disposes an object (i.e., an object formed by a primitive such as a polygon, a free-form surface, or a subdivision surface) in a world coordinate system when the object space is a three-dimensional space. The object space setting section 110 determines the position and the rotation angle (synonymous with orientation or direction) of the object in the world coordinate system, and disposes the object at the determined position (X, Y, Z) and the determined rotation angle (rotation angles around the X, Y, and Z-axes).

The special state transition section 112 determines whether or not a player character has satisfied a special state transition condition based on movement information about the player character. When the special state transition section 112 has determined that the player character has satisfied the special state transition condition, the special state transition section 112 moves the player character to the special point set in the virtual space.

The virtual camera control section 111 disposes (controls placement of) the virtual camera based on at least one of the input information and the movement information about the player character.

The movement information calculation section (movement/motion processing section 114) calculates the position of the player character based on the input information. The special state transition section 112 determines the position of the player character based on the position of the player character and a position determination condition that is set corresponding to a special point in the virtual space, and determines whether or not the player character has satisfied the special state transition condition based on the determination result.

The movement information calculation section (movement/motion processing section 114) may calculate the direction of the player character based on the input information. The special state transition section 112 may determine the direction of the player character based on the direction of the player character and a direction condition that is set corresponding to a special point in the virtual space, and may determine whether or not the player character has satisfied the special state transition condition based on the determination result.

The movement information calculation section (movement/motion processing section 114) may calculate the moving direction of the player character based on the input information. The special state transition section 112 may determine the moving direction of the player character based on the moving direction of the player character and a moving direction condition that is set corresponding to a special point in the virtual space, and may determine whether or not the player character has satisfied the special state transition condition based on the determination result.

The special state transition section 112 may set a parameter used for game calculations to a value advantageous or disadvantageous for the player character as compared with a normal state when the player character is set in the special state.

The special state transition section 112 may switch the state of the player character positioned at the special point between a hiding state and an attack state based on the input information when the player character is set in the special state, and may perform different control depending on the state.

The attack calculation section 113-1 determines an attack start position, and calculates the trajectory of a missile from the attack start position. The attack calculation section 113-1 may determine the attack start position based on the position of the player character in the normal state, and may determine the attack start position based on the position of a virtual camera in the attack state of the special state.

The damage calculation section 113-2 calculates damage applied to the player character based on the attack information. The damage calculation section 113-2 performs a hit check of the player character based on the position of the player character instead of the position of the virtual camera even when the player character is set in the special state.

The movement information calculation section (movement/motion processing section 114) may calculate the posture of the player character or whether or not the player character is positioned directly on the ground based on at least one of the input information and posture information, and the special state transition section 112 may determine whether or not the player character has satisfied the special state transition condition based on the posture of the player character or whether or not the player character is positioned directly on the ground.

The special state transition section 112 may generate drawing control information for drawing an object that blocks the view of the player character in a translucent state when the player character is set in the special state. The image generation section 120 may generate an image of the virtual space in which an object that blocks the view of the player character is displayed in a translucent state based on the drawing control information.

The special state transition section 112 may generate image generation control information for generating an image in which a notification image that indicates the presence of a predetermined object is disposed in the image of the virtual space at a position corresponding to the object. The image generation section 120 may blend the image of the virtual space with the notification image based on the image generation control information to generate the image of the virtual space including the notification image.

The special state transition section 112 may determine a special point to which the player character is moved based on the distance between the player character and each of a plurality of special points when the player character has satisfied the special state transition condition for a plurality of special points in the virtual space.

The special state transition section 112 may determine whether or not the player character has satisfied the special state transition condition based on at least one of a determination result as to whether or not the position of the player character has continuously satisfied the position condition for a predetermined time, a determination result as to whether or not the direction of the player character has continuously satisfied the direction condition for a predetermined time, and a determination result as to whether or not the moving direction of the player character has continuously satisfied the moving direction condition for a predetermined time.

The special state transition section 112 may cancel the special state of the player character when at least one of the position and the direction of the player character has changed based on the input information, and satisfied a special state cancellation condition.

The special state transition section 112 may determine whether or not at least one of the time elapsed after the player character has transitioned to the special state and a predetermined parameter of the player character has satisfied the special state cancellation condition, and may cancel the special state of the player character when the special state transition section 112 has determined that the special state cancellation condition has been satisfied.

The virtual camera control section 111 may reduce the rotation speed of the virtual camera that is synchronized with the player character as compared with the case where the player character is not set in the special state when an operation input that changes the direction of the player character has been performed in the special state.

The communication section 196 functions as a game data communication processing section that transmits game data to and receives game data from another game machine or the server. The communication section 196 may receive game data including special state transition information about the player character of another game machine, and may transmit game data including special state transition information about the player character of the game machine.

The special state transition section 112 may move the player character of the game machine to a given special point when the player character has satisfied the special state transition condition for the given special point, and may move the player character that is positioned at the special point to a position other than the special point when the special state transition section 112 has determined that game data special state transition information about the player character of another game machine and game data special state transition information about the player character of the game machine have an exclusive relationship, and the player character of the game machine has transitioned to the special state later than the player character of the other game machine after the player character of the game machine has moved to the special point.

The special state transition section 112 may move the player character to a position other than the special point when the player character of another game machine and the player character of the game machine have satisfied the special state transition condition for an identical special point, or have satisfied the special state transition condition for special points belonging to an identical group, or have satisfied the special state transition condition for special points having an exclusive relationship.

The special state transition section 112 may move the player character of the game machine to a substitution special point set corresponding to the special point at which the player character of the game machine is positioned, and may cause the player character of the game machine to transition from the normal state to the special state when the player character of another game machine and the player character of the game machine have an exclusive relationship, and the player character of the game machine has transitioned to the special state later than the player character of another game machine.

The movement/motion processing section 114 causes the object to move or make a motion in the object space. Specifically, the movement/motion processing section 114 causes the object to move or make a motion (animation) in the object space based on information input from the input section 160, a program (movement/motion algorithm), various types of data (motion data), and the like. More specifically, the movement/motion processing section 114 sequentially calculates object movement information (movement parameters such as the position, rotation angle, moving speed, acceleration, moving amount, and moving direction) and object motion information (position or rotation angle of each part that forms the object) every frame (e.g., 1/60th of a second). The term "frame" used herein refers to a time unit used when performing the object movement/motion process and the image generation process.

The movement/motion processing section 114 functions as a movement information calculation section that calculates movement information about the player character in the virtual space based on the input information.

The game calculation section 115 performs various game processes. For example, the game calculation section 115 starts the game when game start conditions have been satisfied, proceeds with the game, finishes the game when game finish conditions have been satisfied, and performs an ending process when the final stage has been cleared, for example.

The game calculation section 115 determines whether or not a given parameter (strength value) of the player character has reached a predetermined value (0), and determines that the game has ended when the given parameter (strength value) of the player character has reached the predetermined value (0).

The image generation section 120 performs a drawing process based on the results of various processes performed by the processing section 100 to generate an image, and outputs the generated image to the display section 190. The image generated by the image generation section 120 may be a two-dimensional image, or may be a three-dimensional image.

When the image generation section 120 generates a two-dimensional image, the image generation section 120 sets a priority to each object (sprite), and sequentially draws the objects in ascending order of priority. When the objects overlap, the image generation section 120 draws the object with a higher priority over the object with a lower priority.

When the image generation section 120 generates a three-dimensional game image, the image generation section 120 receives object data (model data) including vertex data of each vertex of the object (model), and performs a vertex process (shading using a vertex shader) based on the vertex data included in the received object data. When performing the vertex process, the image generation section 120 may perform a vertex generation process (tessellation, surface division, or polygon division) for dividing the polygon, if necessary.

In the vertex process, the image generation section 120 performs a vertex movement process and a geometric process such as coordinate transformation (world coordinate transformation or camera coordinate transformation), clipping, or perspective transformation based on a vertex processing program (vertex shader program or first shader program), and changes (updates or adjusts) the vertex data of each vertex that forms the object based on the processing results.

The image generation section 120 then performs a rasterization process (scan conversion) based on the vertex data changed by the vertex process so that the surface of the polygon (primitive) is linked to pixels. The image generation section 120 then performs a pixel process (shading using a pixel shader or a fragment process) that draws the pixels that form the image (fragments that form the display screen). In the pixel process, the image generation section 120 determines the drawing color of each pixel that forms the image by performing various processes such as a texture reading (texture mapping) process, a color data setting/change process, a translucent blending process, and an anti-aliasing process based on a pixel processing program (pixel shader program or second shader program), and outputs (draws) the drawing color of the object subjected to perspective transformation to a drawing buffer (i.e., a buffer that can store image information corresponding to each pixel; VRAM or rendering target). Specifically, the pixel process includes a per-pixel process that sets or changes pixel data or voxel data (e.g., color (RGB), alpha-value, Z-value, and luminance) in pixel units. The image generation section 120 thus generates an image viewed from the virtual camera (given viewpoint) in the object space. When a plurality of virtual cameras (viewpoints) are provided, the image generation section 120 may generate images viewed from the respective virtual cameras.

The virtual camera control section 110 may cause at least one of the distance between the player character and the virtual camera, the positional relationship between the player character and the virtual camera, the direction of the virtual camera relative to the player character, and the angle of view of the virtual camera to differ from that when the player character is not set in the special state when the player character has been set in the special state.

The virtual camera control section 110 may cause at least one of the distance between the player character and the virtual camera, the positional relationship between the player character and the virtual camera, the direction of the virtual camera relative to the player character, and the angle of view of the virtual camera to differ from that when the player character is set in the hiding state when the player character has been set in the attack state.

The virtual camera control section 110 may change at least one of the distance between the player character and the virtual camera, the positional relationship between the player character and the virtual camera, the direction of the virtual camera relative to the player character, and the angle of view of the virtual camera in the special state or the attack state of the special state based on at least one of the attribute, the posture, the motion type used for motion control, and the item type of the player character.

The virtual camera control section 110 controls the virtual camera (viewpoint) for generating an image viewed from a given (arbitrary) viewpoint in the object space. Specifically, the virtual camera control section 110 controls the position (X, Y, Z) or the rotational angle (e.g., the rotational angle of the virtual camera when the virtual camera is rotated clockwise around each of the X, Y, and Z axes) of the virtual camera in the world coordinate system when generating a three-dimensional image. Specifically, the virtual camera control section 110 controls the viewpoint position, the line-of-sight direction, and the angle of view of the virtual camera. The virtual camera control section 110 may rotate the virtual camera by a predetermined rotation angle. In this case, the virtual camera control section 110 controls the virtual camera based on virtual camera data that specifies the position or the rotational angle of the virtual camera. When a plurality of virtual cameras (viewpoints) are provided, the virtual camera control section 110 performs the above control process on each virtual camera.

In this embodiment, first person shooting (FPS) that generates an image based on the viewpoint of the player character (first-person viewpoint), or third person shooting (TPS) that allows the user to operate a hero that appears on the screen may be employed. The movement, the direction, and the angle of view of the virtual camera are controlled based on a program or the information input from the input section 160.

For example, when photographing the object (e.g., player character) from behind using the virtual camera, the virtual camera control section 110 controls the position or the direction of the virtual camera so that the virtual camera follows a change in the position or the direction of the object. In this case, the virtual camera control section 110 may control the virtual camera based on information about the position, direction, speed, and the like of the object obtained by the movement/motion processing section 114. Alternatively, the virtual camera control section 110 may set the virtual camera in a predetermined direction, or may move the virtual camera along a predetermined path. In this case, the virtual camera control section 110 controls the virtual camera based on virtual camera data that specifies the position (moving path) or the direction of the virtual camera. When a plurality of virtual cameras (viewpoints) are provided, the virtual camera control section 110 performs the above control process on each virtual camera.

The vertex process and the pixel process are implemented by hardware that enables a programmable polygon (primitive) drawing process (i.e., a programmable shader (vertex shader and pixel shader)) based on a shader program written in shading language. The programmable shader enables a programmable per-vertex process and a per-pixel process to increase the degree of freedom of the drawing process so that the representation capability can be significantly improved as compared with a fixed drawing process using hardware.

The image generation section 120 performs a geometric process, texture mapping, hidden surface removal, alpha-blending, and the like when drawing the object.

When performing the geometric process, the image generation section 120 subjects the object to coordinate transformation, clipping, perspective projection transformation, light source calculation, and the like. The object data (e.g. object's vertex position coordinates, texture coordinates, color data (luminance data), normal vector, or alpha-value) obtained by the geometric process (perspective transformation) is stored in the storage section 170.

The term "texture mapping" refers to a process that maps a texture (texel value) stored in the storage section 170 onto the object. Specifically, the image generation section 120 reads a texture (surface properties such as color (RGB) and alpha-value) from the storage section 170 using the texture coordinates set (assigned) to the vertices of the object and the like. The image generation section 120 then maps the texture (two-dimensional image) onto the object. In this case, the image generation section 120 performs a pixel-texel linking process, a bilinear interpolation process (texel interpolation process), and the like.

The image generation section 120 may perform a hidden surface removal process by a Z-buffer method (depth comparison method or Z-test) using a Z-buffer (depth buffer) that stores the Z-value (depth information) of the drawing pixel. Specifically, the image generation section 120 refers to the Z-value stored in the Z-buffer when drawing the drawing pixel corresponding to the primitive of the object. The image generation section 120 then compares the Z-value stored in the Z-buffer with the Z-value of the drawing pixel of the primitive. When the Z-value of the drawing pixel is the Z-value in front of the virtual camera (e.g., a small Z-value), the image generation section 120 draws the drawing pixel and updates the Z-value stored in the Z-buffer with a new Z-value.

The term "alpha blending" refers to a translucent blending process (e.g., normal alpha blending, additive alpha blending, or subtractive alpha blending) based on the alpha-value (A value).

Note that the alpha-value is information that can be stored corresponding to each pixel (texel or dot), such as additional information other than the color information. The alpha-value may be used as mask information, translucency (equivalent to transparency or opacity), bump information, or the like.

The sound generation section 130 performs a sound generation process based on the results of various processes performed by the processing section 100 to generate game sound such as background music (BGM), effect sound, or voice, and outputs the generated game sound to the sound output section 192.

The image generation device according to this embodiment may be a device dedicated to a single-player mode that allows only one player to play the game, or may be a device that also implements a multi-player mode that allows a plurality of players to play the game.

Figure 22:
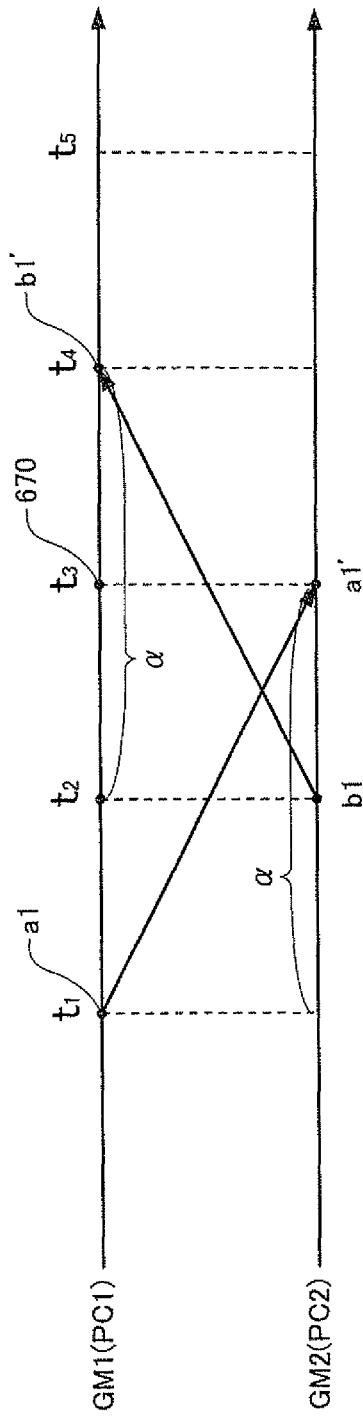
FIG. 22 is a diagram illustrating generation and transmission/reception of game data in a multi-player mode.

For example, a multi-player mode may be implemented by providing input sections 160-1 and 160-2 for respective players, and performing an enemy character hit process or the like based on the gun sight position indicated by each of the input sections 160-1 and 160-2, as illustrated in FIG. 22. In this embodiment, data, a display output image, a calculation image, and game sound provided to a plurality of players are generated using a single image generation device. Note that the image generation device may transmit data (e.g., input information) to and receives data from another image generation device via a network, and may perform the image generation process based on the received data and the information input from the input section 160.

2. Method (1) Special Point

Figure 16:
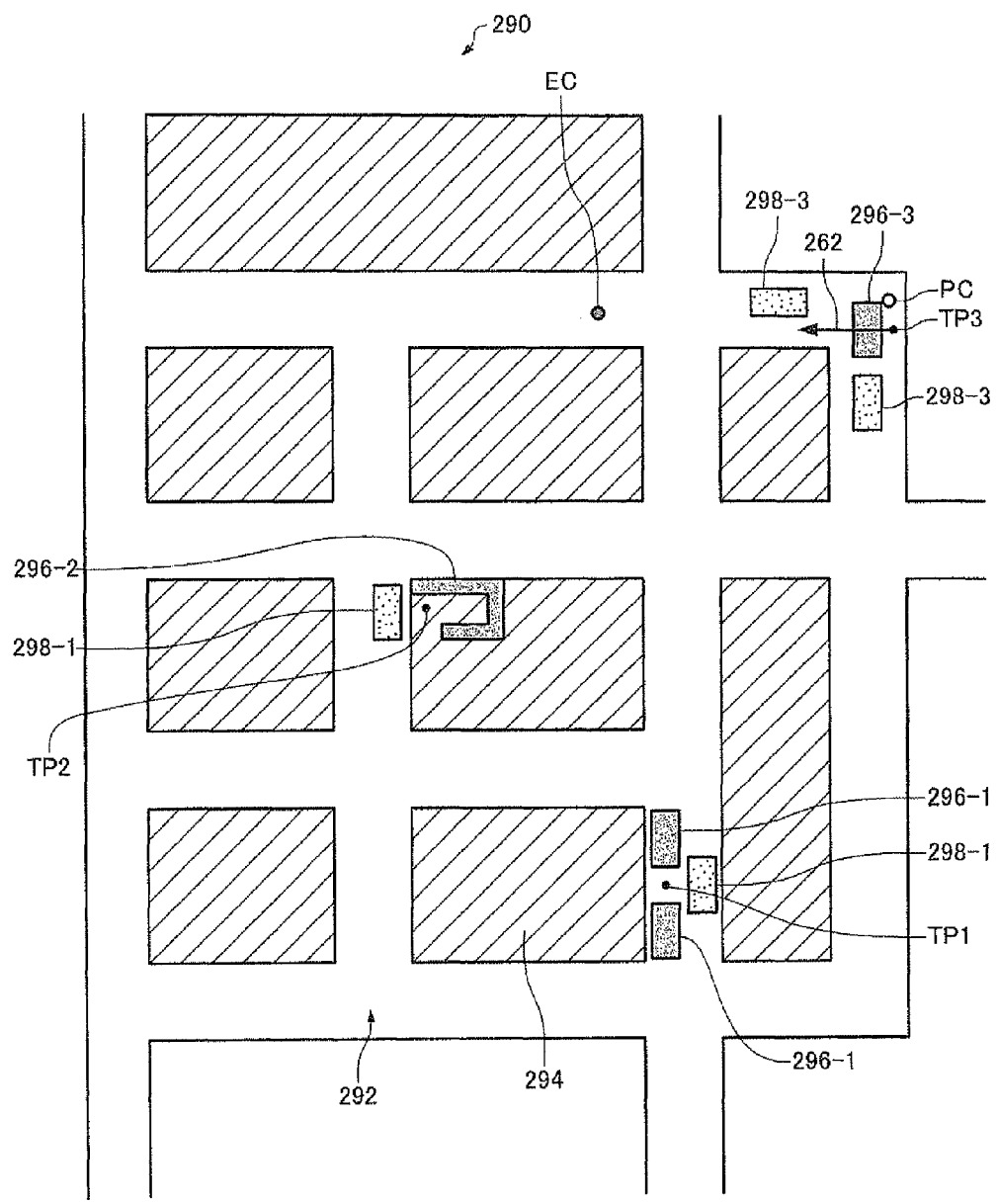
FIG. 16 is a diagram illustrating a virtual space where a player character and an enemy character are disposed.

FIG. 16 is a diagram illustrating a virtual space where a player character and an enemy character are disposed. A virtual space 290 imitates the topography of a city. A road 292 is set in the virtual space 290 so that a player character CP can pass through. A stationary object 294 (shaded area) (e.g., building) is disposed in an area other than the road 292. The player character CP cannot pass through the stationary object 294. The player can arbitrarily move the player character PC on the road 290 set in the virtual space by operating a lever, a button, or the like that is provided in the operation section and allows the player to input a direction instruction. At least one special point (TP1, TP2, TP3, . . . ) is designated in advance on the map of the virtual space 290. The special point (TP1, TP2, TP3, . . . ) is a place within the virtual space that is advantageous when playing the game. For example, the special point (TP1, TP2, TP3, . . . ) may be set at a position behind a defense barrier object (296-1, 296-2, 296-3) (e.g., wall, building, tree, car, or rock) (i.e., a place where the player character CP is not easily attacked by an enemy).

In this embodiment, whether or not the player character PC has satisfied a special state transition condition is determined based on movement information about the player character PC. When it has been determined that the player character PC has satisfied the special state transition condition, the player character PC transitions from a normal state to a special state, and moves to the special point set in the virtual space.

For example, the player character PC may transition to the special state when the player has performed a specific operation input (special state transition input) in a state in which the player character PC is positioned in an area 298-1, 298-2, or 298-3 around the special point that is designated in advance on the map of the virtual space 290. When the player character PC has transitioned to the special state, the player character PC automatically moves to the special point (TP1, TP2, TP3, . . . ). This makes it possible to cause the player character PC to leave a hiding place and attack the enemy character, or hide itself in a hiding place (i.e., increase the attack capability or the defense capability) by a simple operation.

(2) Special Point Setting Information

Figure 2:
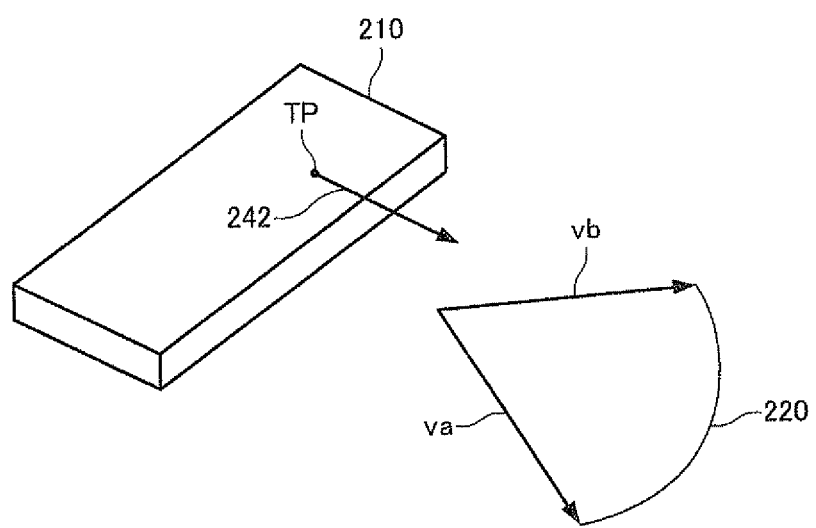
FIG. 2 is a diagram illustrating a special state transition condition and special state control information.

In this embodiment, the special state transition condition and special state control information are stored as special point setting information. FIG. 2 is a diagram illustrating the special state transition condition and the special state control information, and FIG. 3 is a table illustrating the special point setting information about each special point.

Special point setting information 310 includes a special point ID 311 (i.e., information that specifies the special point set in the virtual space), and parameters such as the special state transition condition (collision information 312, direction condition 313, and priority order 317), and the special state control information (special state position information 314, special state direction information 315, and attack pattern information 316). For example, a parameter table in which these parameters are linked to each special point may be provided.

The collision information 312 is information that is linked to a special point 214 in order to determine whether or not the special state transition condition has been satisfied, and specifies a collision area (two-dimensional determination area or three-dimensional determination box) 210 for determining the position of the player character. The collision area 210 may be information about the vertex or a polygon of a two-dimensional determination area or a three-dimensional determination box, or may be storage area access information (address or collision identification information), for example. The player character does not transition to the special state when the player character does not come in contact with the collision area 210. For example, the area 298-1, 298-2, or 298-3 around the special point illustrated in FIG. 16 may be set as the collision area 210.

The direction condition 313 is information that is linked to the special point TP in order to determine whether or not the special state transition condition has been satisfied, and indicates a condition (allowable direction range 220) for determining the direction of the player character. For example, the allowable direction range 220 in an XZ plane of the player character may be set as the direction condition 313. A vector va and a vector vb that define the allowable range 220 may be set as the direction condition 313. The special state transition condition is not satisfied (i.e., the player character does not transition to the special state) when the direction of the player character (direction in the XZ plane) is outside the allowable range 220 when the player has performed the special state transition input. In this embodiment, the player can change the direction of the player character (direction of the virtual camera) after the player character has entered the special state. The special state of the player character may be canceled when the direction of the player character (direction of the virtual camera) has exceeded the allowable range. The direction of the player character and the direction of the virtual camera may be linked (synchronized), or may be controlled independently.

The special point position information 314 indicates the position coordinates of the special point to which the player character that has transitioned to the special state moves.

The special state direction information 315 indicates the direction (e.g., the direction of a three-dimensional vector) of the player character (virtual camera) immediately after the player character has transitioned to the special state. The direction of the player character may be expressed by rotations around three-axis directions.

For example, the special point TP3 illustrated in FIG. 16 is set behind the defense barrier object 296-3. When the player character CP is positioned at the special point TP3, the player character CP hides itself behind the defense barrier object 296-3, and attacks the enemy character EC across the defense barrier object 296-3. A direction (direction of defense barrier) 262 in which the enemy is expected to be present when the player character CP is positioned at the special point TP3 may be set as the special state direction information 350 about the player character PC in the special state.

Figure 4:
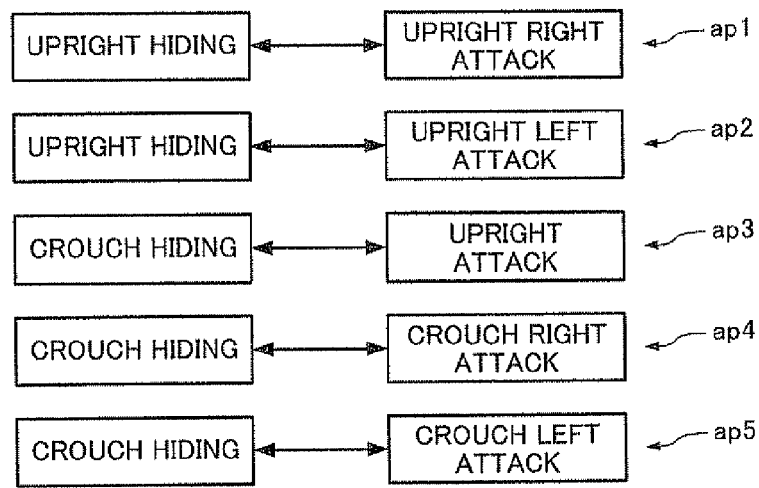
FIG. 4 is a diagram illustrating an example of an attack pattern according to one embodiment of the invention.

The attack pattern identification information 316 specifies the attack pattern of the player character at the special point. In this embodiment, a different attack pattern is provided depending on the special point. FIG. 4 is a diagram illustrating an example of the attack pattern according to this embodiment. Specifically, a plurality of attack patterns ap1 to ap5 are provided so that the player can enjoy various attack patterns, and the attack pattern linked to each special point is used.

The state of the player character CP positioned at the special point is switched between a hiding state (i.e., a state in which the player character CP gets behind and cannot attack the enemy) and an attack state (i.e., a state in which the player character CP puts out part of the body and attacks the enemy) based on the input information. The player character CP may be set in the attack state when the player has performed an attack input, and may be set in the hiding state when the player does not perform an attack input, for example.

The state of the player character CP positioned at the special point may be switched to the hiding state when the player does not perform an attack input (e.g., bullet firing input), and may be switched to the attack state when the player has performed an attack input. This makes it possible for the player to enjoy shooting by getting behind and then attacking the enemy.

Figure 17A:
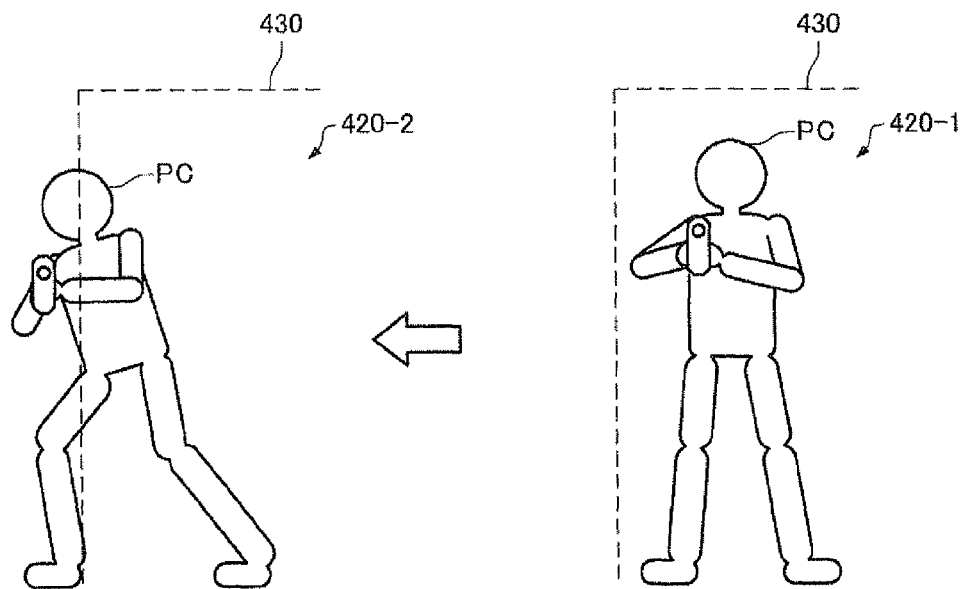
FIGS. 17A and 17B are diagrams illustrating a player character PC set in a hiding state or an attack state.

In FIG. 17A, reference numeral 420-1 indicates a state in which the player character PC is set in the hiding state at the special point TP1 (i.e., the player character PC hides itself behind a wall 430 having a height larger than the height of the player character PC), and reference numeral 420-2 indicates a state in which the player character PC is set in the attack state at the special point TP1.

The attack pattern ap1 is linked to the special point TP1. The player character PC stands upright and hides itself behind the wall 430 in the hiding state (420-1) ("upright hiding"), and stands upright and attacks the enemy character while putting out the right side of the body from the wall 430 in the attack state (420-2) ("upright right attack") in accordance with the attack pattern ap1. Specifically, when the player character PC is positioned at the special point TP1, the player character PC makes an upright hiding motion (i.e., the player character PC stands upright and hides itself behind the wall 430) in the hiding state (i.e., when the player does not perform an attack input), and makes an upright right attack motion (i.e., the player character PC stands upright and attacks the enemy character while putting out the right side of the body from the wall 430) when the player has performed an attack input (e.g., bullet firing input).

Figure 17B:
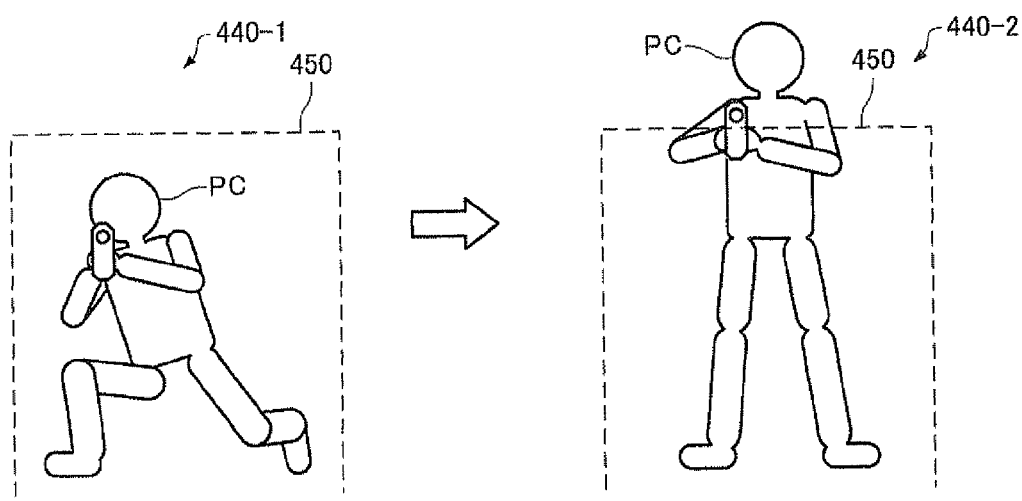

In FIG. 17B, reference numeral 440-1 indicates a state in which the player character PC is set in the hiding state at the special point TP3 (i.e., the player character PC hides itself behind a wall 450 having a height smaller than the height of the player character PC), and reference numeral 440-2 indicates a state in which the player character PC is set in the attack state at the special point TP3.

The attack pattern ap3 is linked to the special point TP3. The player character PC crouches and hides itself behind the wall 450 in the hiding state (440-1) ("crouch hiding"), and stands upright and attacks the enemy character while putting out the upper part of the body from the wall 450 in the attack state (440-2) ("upright attack") in accordance with the attack pattern ap3. Specifically, when the player character PC is positioned at the special point TP3, the player character PC makes a crouch hiding motion (i.e., the player character PC crouches and hides itself behind the wall 450) in the hiding state (i.e., when the player does not perform an attack input), and makes an upright attack motion (i.e., the player character PC stands upright and attacks the enemy character while putting out the upper part of the body from the wall 450) when the player has performed an attack input (e.g., bullet firing input).

The priority order 317 is priority setting information when the collision areas of a plurality of special points overlap, and the player character has simultaneously satisfied the special state transition condition in connection with a plurality of special points. A value that indicates the priority or the like may be stored as the priority order 317, and one of the special points may be preferentially selected based on the priority.

(3) Attack Pattern Setting Information

FIG. 18 is a diagram illustrating attack pattern setting information. Attack pattern setting information 320 illustrated in FIG. 18 includes attack pattern identification information 316, a motion pattern 322, virtual camera position information (hiding state) 334, virtual camera position information (attack state) 336, virtual camera direction information (hiding state) 338, and virtual camera direction information (attack state) 340 (attack pattern control preset values).

The motion pattern 322 is information that specifies motion data about the motion patterns respectively corresponding to the attack patterns ap1 to ap5 illustrated in FIG. 4. The motion of the player character positioned at the special point can be implemented by reproducing the motion data indicated by the motion pattern based on the coordinates of the special point. When the player character is set in the special state, the position of the player character in the world coordinate system is fixed to the position of the special point. The player character moves in the virtual space when the position of the player character in the local coordinate system has changed due to a motion.

The attack pattern ap1 is set so that the state of the player character is switched between the upright hiding state (hiding state) and the upright right attack state (attack state). Upright hiding motion data and upright right attack motion data are provided to implement the attack pattern ap1. Hiding state motion data and attack state motion data are similarly provided to implement the attack patterns ap2 to ap5.

Figure 5:
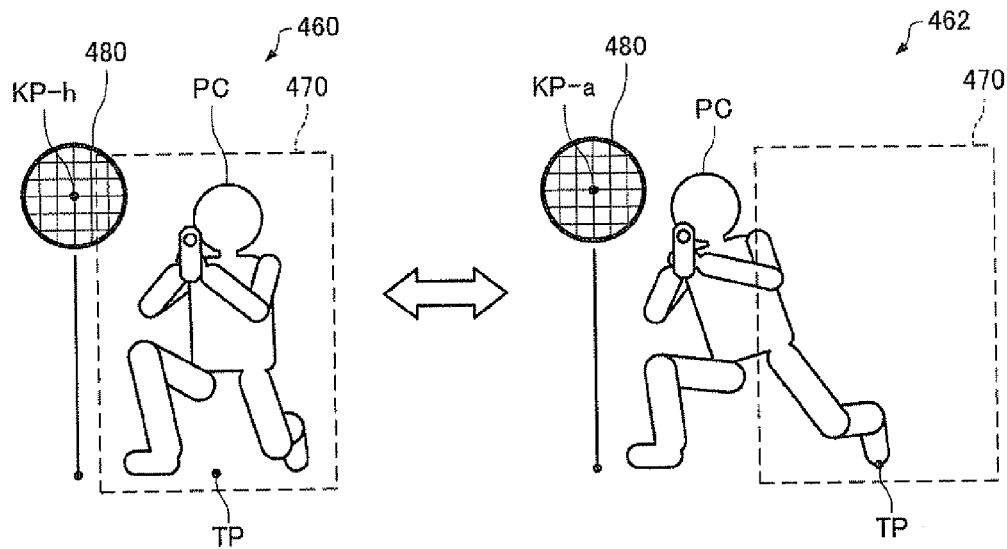
FIG. 5 is a diagram illustrating special attack pattern motion control.

FIG. 5 is a diagram illustrating special attack pattern motion control.

The state of the player character PC positioned at the special point is switched between a hiding state 460 and an attack state 462 based on an attack input. The motion of the player character PC in each state is implemented based on the motion data corresponding to the motion pattern included in the attack pattern setting information that is set corresponding to each special point.

When causing the player character CP to make a motion in the special state, only the player character CP makes a motion at the special point TP.

As illustrated in FIG. 5, a position KP-h of a virtual camera 480 in the hiding state 460 differs from the position (special point) TP of the player character in the special state so that the player can easily observe the enemy character. In the normal state, the position KP-h of the virtual camera 490 may be the same as the position of the player character, or may follow the position of the player character at a constant interval.

At least one of the distance between the player character and the virtual camera, the positional relationship between the player character and the virtual camera, the direction of the virtual camera relative to the player character, and the angle of view of the virtual camera differs between the attack state and the hiding state in the special state. Therefore, the attack pattern setting information 320 includes hiding state camera position information 334 and attack state camera position information 336.

The position KP-h of the virtual camera 480 in the hiding state 460 is a virtual camera reference position in the hiding state 460. The position KP-h of the virtual camera 480 may be indicated by the difference from the position (special point) TP of the player character. For example, the position KP-h of the virtual camera 480 may be indicated by coordinates in a local coordinate system in which the position (special point) TP of the player character CP is the origin.

A position KP-a of the virtual camera 480 in the attack state 462 is a virtual camera reference position in the attack state 462. The position KP-a of the virtual camera 480 may be indicated by the difference from the position (special point) of the player character. For example, the position KP-a of the virtual camera 480 may be indicated by coordinates in a local coordinate system in which the position (special point) TP of the player character CP is the origin.

Virtual camera speed information (hiding state) 338 indicates a speed pattern of the virtual camera when a transition from the hiding state to the attack state occurs.

Virtual camera speed information (attack state) 340 indicates a speed pattern of the virtual camera when a transition from the attack state to the hiding state occurs.

(4) Special State Transition Control

In this embodiment, the player character PC transitions to the special state when the player character has come in contact with the collision area of one of the special points, the direction of the player character satisfies the direction condition that is set to the special point, and the player character is positioned directly on the ground. Whether or not the player character is positioned directly on the ground may be determined based on the position and the posture of the player character. For example, the Y-coordinate value yp of the position coordinates (xp, yp, zp) of the player character may be compared with the Y-coordinate value ym of the map coordinates having the same X-coordinate value and the same Z-coordinate value, and it may be determined that the player character is not positioned directly on the ground when yp>ym. Whether the player character is in a jump state, a crouch state, a walking state, a stationary state, or the like may be determined based on posture data about the player character, and it may be determined that the player character is positioned directly on the ground when the player character is in a state other than the jump state.

The player character may transition to the special state when the moving direction of the player character satisfies a moving direction condition that is set corresponding to each special point in the virtual space. In this case, a direction condition may be set as the special direction setting condition corresponding to each special point.

Figure 6:
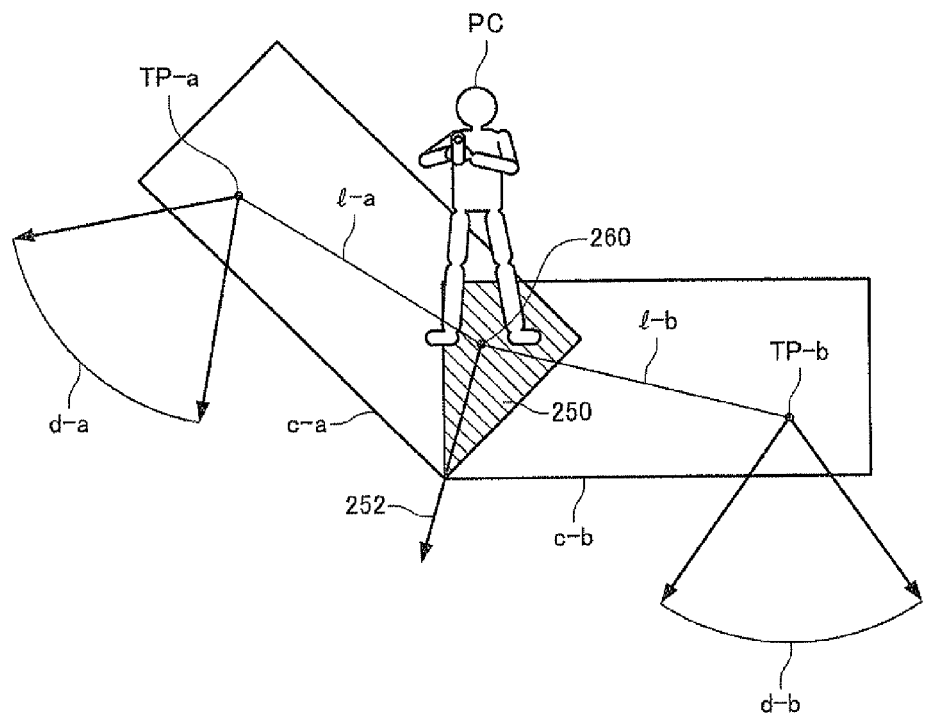
FIG. 6 is a diagram illustrating an example in which a plurality of adjacent special points are present in a virtual space.

FIG. 6 is a diagram illustrating an example in which a plurality of special points are present in the virtual space at a small interval. A collision area c-a and an allowable direction range (direction condition) d-a are set to a special point TP-a, and a collision area c-b and an allowable direction range (direction condition) d-b are set to a special point TP-b. As illustrated in FIG. 6, the collision areas c-a and c-b overlap in an area 250. When a position 260 of the player character PC is included in the area 250, and a direction 252 of the player character PC is included within the allowable direction ranges (direction condition) d-a and d-b of the special points TP-a and TP-b, the player character PC satisfies the special state transition condition with respect to the special points TP-a and TP-b.

In this case, the special point to which the player character PC moves may be determined based on a distance 1-*a* between the position 260 of the player character PC and the special point TP-a, and a distance 1-*b* between the position 260 of the player character PC and the special point TP-b. When 1-*a*>1-*b*, for example, the player character PC may be moved to the special point TB-b.

Since the priority order information (317 in FIG. 3) is set to each special point, the player character PC may be moved to the special point that is given a higher priority.

(5) Virtual Camera Control in Special State

Figure 7A:
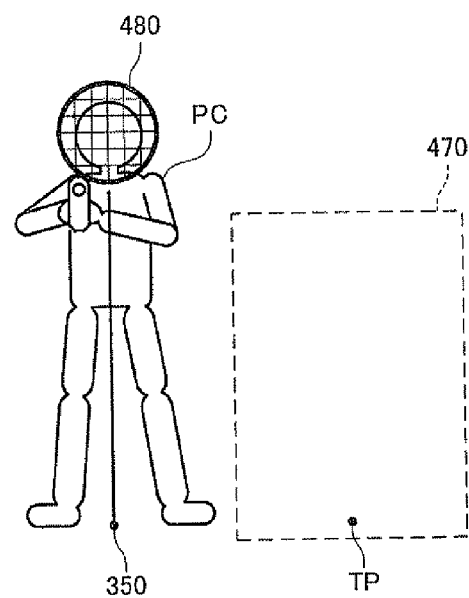
FIGS. 7A and 7B are diagrams illustrating player character motion control and virtual camera placement control in a special state.
Figure 7B:
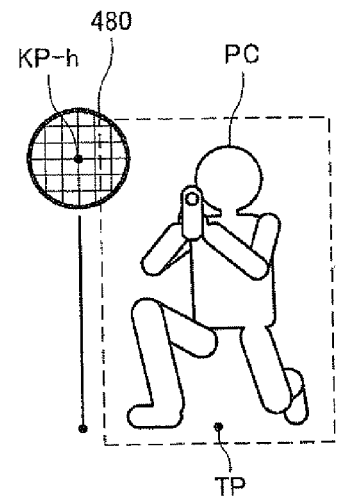

FIGS. 7A and 7B are diagrams illustrating player character motion control and virtual camera placement control in the special state. FIG. 7A illustrates the positional relationship between the player character PC (position 350) and the virtual camera 480 in the normal state (i.e., before the player character PC moves to the special point), and FIG. 7B illustrates the positional relationship between the player character PC and the virtual camera 480 in the hiding state (i.e., the player character does not attack the enemy character) at the special point TP.

When the player character has satisfied the special state transition condition, the virtual camera 480 is directed to the special point TP based on a program. The virtual camera 480 is moved to the special state camera position KP-h (i.e., the position indicated by the virtual camera position information (hiding state) (334 in FIG. 17) that is set corresponding to the attack pattern at the special point) within a predetermined time (may be set as a special point moving time), and is set in a predetermined direction (e.g., the direction of the player character described with reference to FIG. 2, or a direction indicated by the special state direction information 315 illustrated in FIG. 3).

The player character PC is also directed to the special point TP based on a program. The player character PC is moved to the special point TP within a predetermined time (may be set as a special point moving time), and is set in a predetermined direction (e.g., the direction of the player character described with reference to FIG. 2, or a direction indicated by the special state direction information 315 illustrated in FIG. 3). In this case, the player character PC makes a motion so that the player character PC is set in the hiding state motion.

Figure 8:
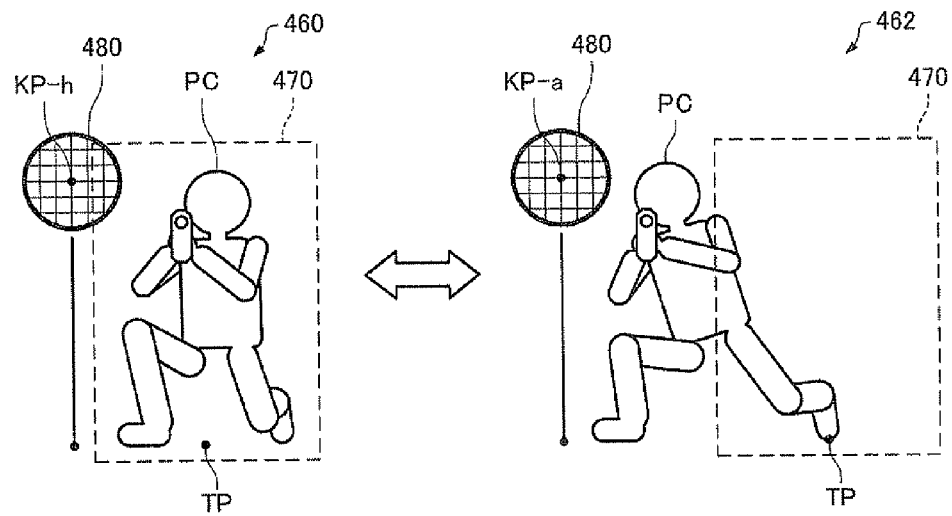
FIG. 8 is a diagram illustrating control of switching between a hiding state and an attack state.

FIG. 8 is a diagram illustrating control of switching between the hiding state and the attack state.

When the player character PC is set in the hiding state 460 (i.e., special state), the virtual camera 480 is set at the virtual camera position KP-h (virtual camera position determined based on the virtual camera position information 334 in FIG. 18) in the hiding state. The position of the virtual camera 480 relative to the player character in the hiding state (i.e., special state) may be the same as or different from that in the normal state.

When the player has performed an attack state transition input (attack input) (e.g., gun firing input) when the player character PC is set in the hiding state 460, the player character PC enters the attack state, and the virtual camera 480 moves to the virtual camera position KP-a (virtual camera position determined based on the virtual camera position information 336 in FIG. 18) in the attack state.

As illustrated in FIG. 8, the distance between the player character and the virtual camera, the positional relationship between the player character and the virtual camera, the direction of the virtual camera relative to the player character, and the like in the attack state differ from those in the hiding state and the normal state.

At least one of the distance between the player character and the virtual camera, the positional relationship between the player character and the virtual camera, the direction of the virtual camera relative to the player character, and the angle of view of the virtual camera may be changed in the special state or the attack state of the special state based on at least one of the item type, the attribute, the posture, and the motion type used for motion control of the player character. This makes it possible to provide an optimum attack image in the special state based on the weapon type, the attribute (size), the posture, and the motion of the player character.

The position coordinates of the player character PC in the world coordinate system are fixed to the special point even when the state of the player character PC has been switched from the hiding state to the attack state. The attack state transition motion is reproduced, and the position of the player character changes within the motion moving amount.

When the state of the player character PC is switched from the hiding state to the attack state, only the player character PC makes a motion, and the virtual camera 480 moves independently of the motion of the player character PC. The moving amount of the virtual camera differs from the moving amount of the player character when the state of the player character PC is switched from the hiding state to the attack state, but the moving speed of the virtual camera is set to be identical with the moving speed of the player character.

When the player has performed a hiding input (e.g., a hiding instruction input or attack end determination made when a firing input is not continuously performed) when the player character PC is set in the attack state 462 (i.e., special state), the player character PC enters the hiding state, and the virtual camera 480 and the player character PC make a motion different from that when the state of the player character PC is switched from the hiding state to the attack state. The player character PC is in the hiding state during switching.

Note that the player character PC is set in the direction indicated by the special state direction information 315 (see FIG. 3) only when the player character PC makes a special state transition motion (i.e., moves to the special point) (i.e., the player character PC is not set in the direction indicated by the special state direction information 315 when the state of the player character PC is switched in the special state).

However, when causing the player character PC to make a motion, the direction of the player character PC may gradually change due to an error in moving amount. Therefore, the position coordinates of the player character PC in the world coordinate system may be reset to the special point when the player character PC has entered the hiding state.

FIGS. 25A to 25D are diagrams illustrating the attack start position in the special state or the normal state.

Figure 25A:
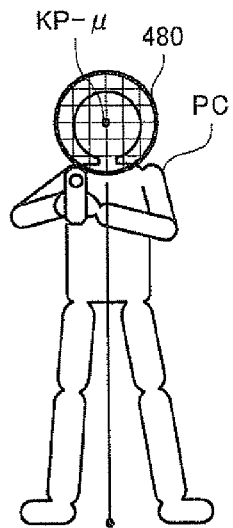
FIGS. 25A to 25D are diagrams illustrating an attack start position in a special state or a normal state.
Figure 25B:
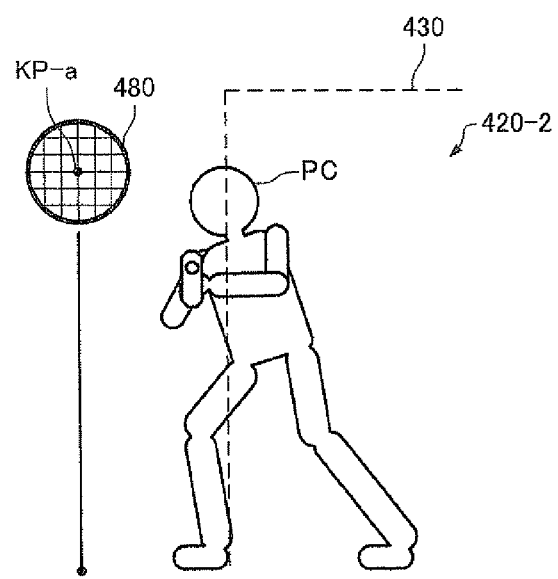
Figure 25C:
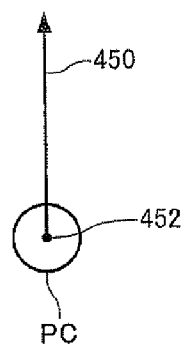

When implementing a first-person viewpoint game, the position of the virtual camera 480 is set around the face of the player character. As illustrated in FIG. 25A, the virtual camera 480 is set at a position KP-u around the face of the player character when the player character is set in the normal state.

When the player character is set in the special state (particularly the attack state), the virtual camera 480 is set at a position away from the face of the player character (i.e., the virtual camera position KP-a in the attack state (virtual camera position determined based on the virtual camera position information 336 in FIG. 18)). Specifically, when the player character is set in the attack state, the player character attacks the enemy character (fires a gun). Since the wall 430 is present in front of the player character in the special state, it is difficult to observe the enemy character if the virtual camera is set at a position near the face of the player character.

When the player character attacks the enemy character by firing a bullet from a gun, the attack start position is normally set based on the position of the player character, and the trajectory of a missile (e.g., bullet, arrow, or bomb) is calculated. Specifically, attack calculations (e.g., hit check) are performed by providing a ray 450 from an attack start position 452 (the height of the attack start position 452 is appropriately set) that is set based on the position of the player character PC (see FIG. 25C).

Figure 25D:
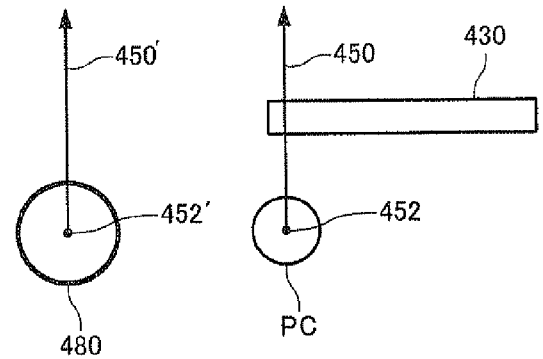

However, when the player character is set in the attack state of the special state, the ray 450 may be interrupted by the wall (see FIG. 25D). Since the virtual camera 480 is disposed at the virtual camera position KP-a away from the player character PC when the player character is set in the attack state of the special state, the player can observe the enemy character on the screen (i.e., the field of view is not interrupted by the wall 430). However, a situation in which a bullet is interrupted by the wall 430 even if the player has fired a bullet based on the image on the screen may occur, so that the player may be given a wrong impression.

In order to deal with this problem, when the player character is set in the attack state of the special state, attack calculations (e.g., hit check) are performed by providing a ray 450' from an attack start position 452' (the height of the attack start position 452' is appropriately set) that is set based on the virtual camera position KP-a (see FIG. 25D).

Specifically, the attack start position (e.g., muzzle) can be moved to a position where the ray is not interrupted by determining the attack start position based on the position of the virtual camera when the player character is set in the attack state of the special state. Therefore, even when the virtual camera is set at a position away from the player character (e.g., when the player character is set in the attack state of the special state), a situation in which a bullet fired from the player character hits the wall or the like, but does not hit the enemy character does not occur. Therefore, the player is not given a wrong impression.

When calculating damage to the player character based on the attack information, a hit check of the player character is performed based on the position of the player character (even when the player character is set in the first-person viewpoint attack state). When the player character is set in the attack state, the virtual camera is positioned away from the player character. The player character can be set at a position where the player character is not easily attacked by the enemy character by performing a hit check based on the position of the player character.

(6) Parameter Control in Special State

When the player character is positioned at the special point, a parameter used for game calculations may be set to a value advantageous for the player character as compared with the normal state. The parameter used for game calculations may be a parameter (e.g., attack, defense, damage level, recovery, life, and hit score) set corresponding to the player character, or may be a parameter (e.g., attack, defense, damage level, recovery, life, and hit score) set corresponding to the enemy character.

For example, when the damage level parameter set corresponding to the player character is set based on damage applied to the player character when the player character has been hit, the damage level parameter is set to 100 in the normal state, and is set to 0 in the special state.

When the hit score parameter corresponding to the enemy character specifies the hit score of the enemy character, the hit score parameter of the enemy character is set to be lower than that in the normal state when the player character is positioned at the special point.

Specifically, when the parameter used for game calculations is set to a value advantageous for the player character as compared with the normal state, the player character may not be hit, or may not be damaged, or the damage level may be reduced as compared with the normal state even if the enemy character has attacked the player character.

Figure 12A:
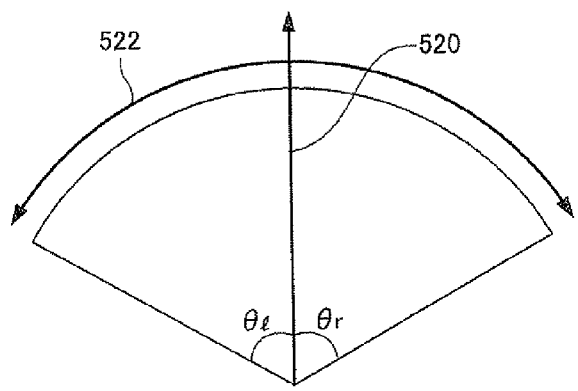
FIGS. 12A and 12B are diagrams illustrating a range in which damage applied to a player character when the player character is attacked by an enemy character is reduced (or set to 0).
Figure 12B:
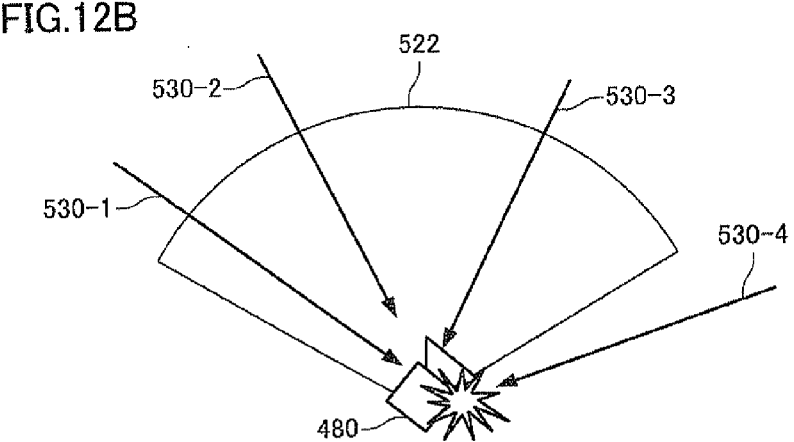

FIGS. 12A and 12B are diagrams illustrating a range in which damage applied to the player character when the player character is attacked by the enemy character is reduced (or set to 0).

When the player character is set in the hiding state of the special state, the player character is not damaged when the player character is attacked by the enemy character positioned forwards from the player character. Specifically, the player character is not damaged even if the player character has been hit. When the player character is set in the attack state of the special state, the damage process (i.e., a specified amount of damage is applied to the player character when the player character has been hit) is performed in the same manner as in the normal state.

In this embodiment, the player character is not damaged when the player character has been hit (attacked) by the enemy character positioned within a predetermined range 522 that is set based on a direction 520 (242 in FIG. 2, a direction indicated by the special state direction information 315 in FIG. 3) when the player character is positioned at the special point after the player character has transitioned to the special state. The direction 520 when the player character is positioned at the special point after the player character has transitioned to the special state may differ from the direction of the player character. Specifically, the direction of the player character may change due to an operation performed by the player. The predetermined range 522 may differ between the special points, or may be set to an identical range (i.e., allowable angles theta-r and theta-l with respect to the reference direction are set to identical values) for each special point.

Whether or not the attack direction is within the predetermined range 522 may be determined by determining whether or not an attack trajectory (530-1, 530-2, 530-3, 530-4) is within the predetermined range 522 (see FIG. 12B). Since the trajectories 530-1, 530-2, and 530-3 are within the predetermined range 522, the player character is not damaged when the player character has been hit along each of trajectories 530-1, 530-2, and 530-3. Since the trajectory 530-4 is outside the predetermined range 522, a specified amount of damage is applied to the player character when the player character has been hit along the trajectory 530-4.

Figures 13A, 13B:
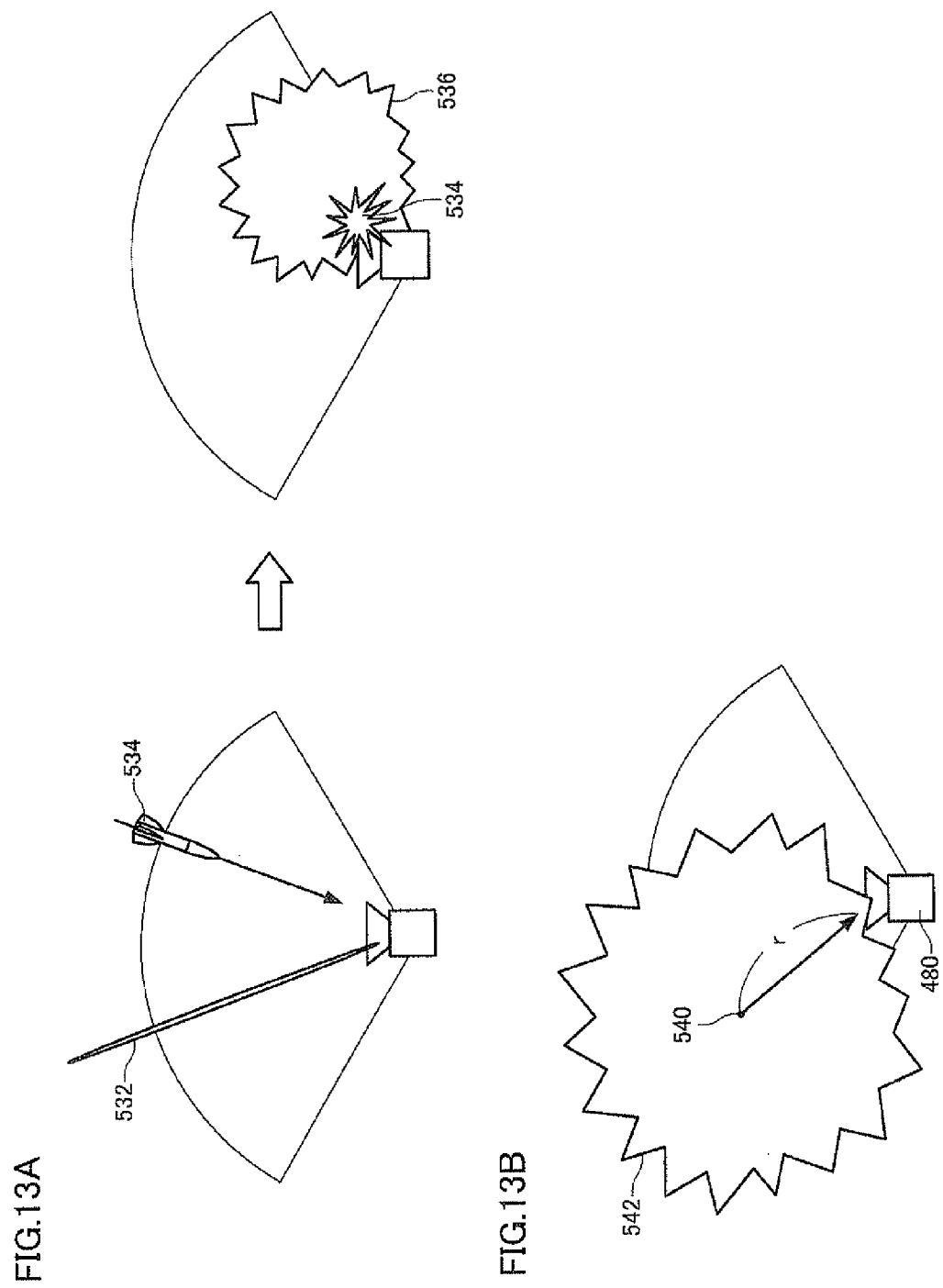
FIGS. 13A and 13B are diagrams illustrating the type of attack by which a player character is not damaged.

FIGS. 13A and 13B are diagrams illustrating the type of attack by which the player character is not damaged.

In FIG. 13A, reference numeral 532 indicates an instantaneous trajectory (ray) (e.g., bullet fired from a pistol), and reference numeral 534 indicates a non-instantaneous trajectory (ray) (e.g., missile). The player character is not damaged only when performing a hit check using a ray (ray check). The term "ray" refers to a line (straight line or curve) that indicates a trajectory, a line of sight, or the like. The term "ray check" refers to a hit check that calculates a hit with a ray.

FIG. 13B is a diagram illustrating damage applied to the player character due to an explosive (e.g., mine) that is set in an arbitrary place 540 (explosion position). The effect of explosion occurs within a predetermined range (explosion effect range 542) (radius: r) around the explosion position 540. The player character is damaged when the player character (virtual camera 480) is positioned within the explosion effect range 542 at the time of explosion. The player character is normally damaged when the player character has been hit by the enemy character positioned close to the player character (e.g., hand-to-hand fight).

An explosion 534 may occur due to a missile or the like. In this case, an explosion effect range 536 is set, and the player character is damaged when the player character is positioned within the explosion effect range 536.

Figure 14:
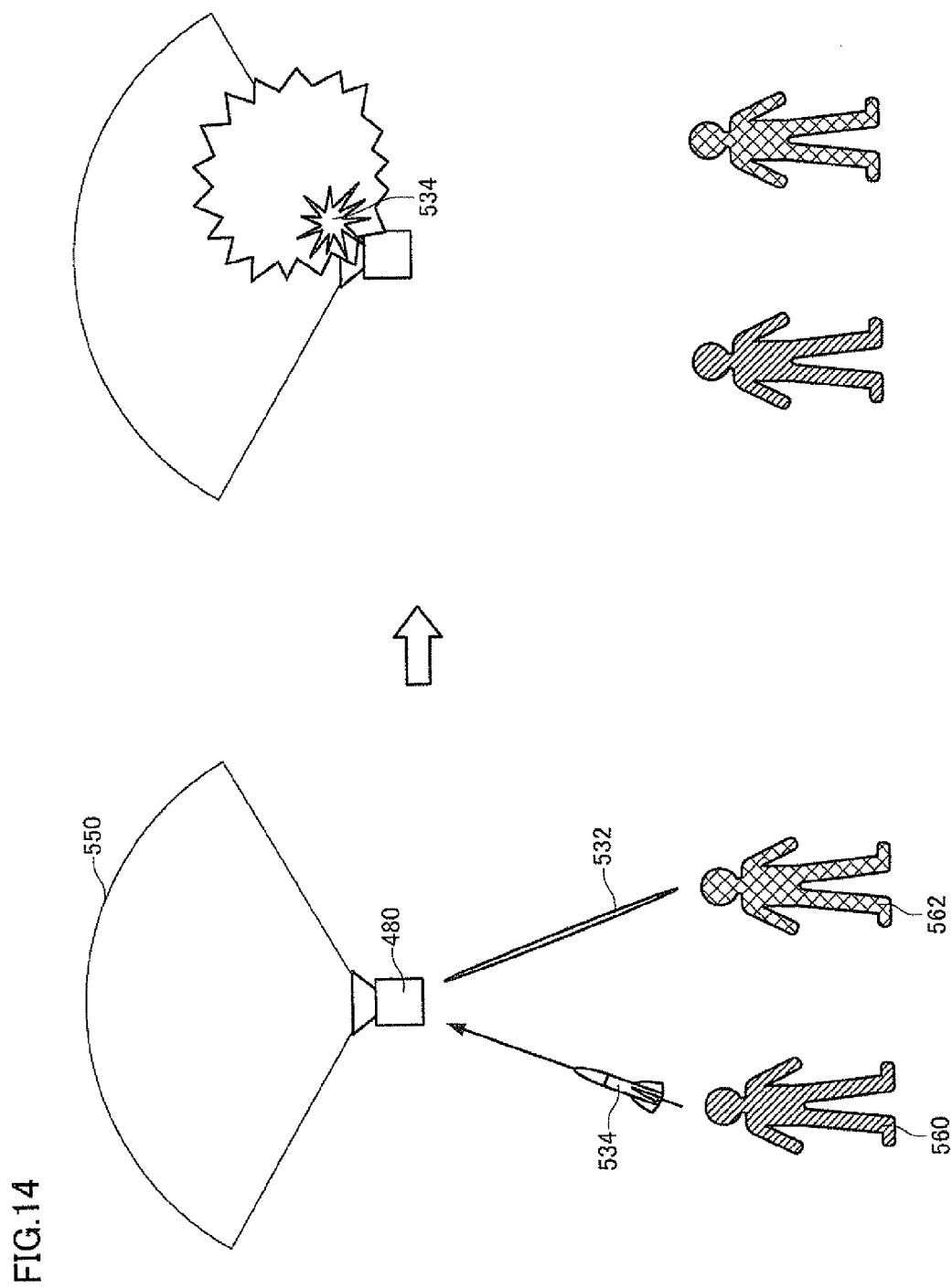
FIG. 14 is a diagram illustrating a case where a player character is attacked by an enemy character that is positioned outside the field-of-view range of the player character when the player character is set in a special state.

FIG. 14 is a diagram illustrating a case where the player character is attacked by an enemy character that is positioned outside the field-of-view range of the player character when the player character is set in the special state. As illustrated in FIG. 14, when enemy characters 560 and 562 that are positioned outside a field-of-view range 550 have fired a non-instantaneous bullet 534 and an instantaneous bullet 532, respectively, a basic damage value due to attack (single bullet) may be set to 0.

Note that the player character is not damaged when the player character has been hit by a non-instantaneous bullet, but is normally damaged when an explosion 534 occurs.

(7) Display Control in Special State

Figure 15A:
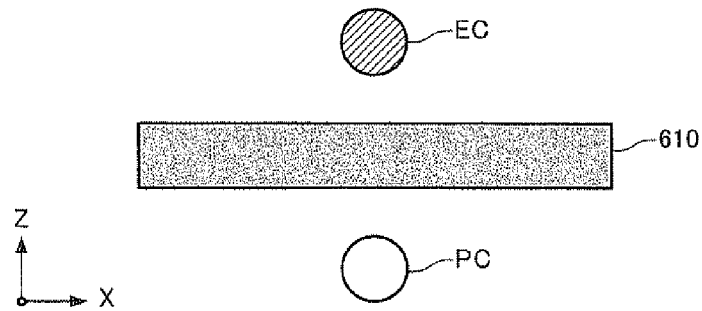
FIGS. 15A to 15C are diagrams illustrating the positional relationship (XZ plane or YZ plane) between a player character set in a special state (particularly a hiding state), a wall, and an enemy character.
Figure 15B:
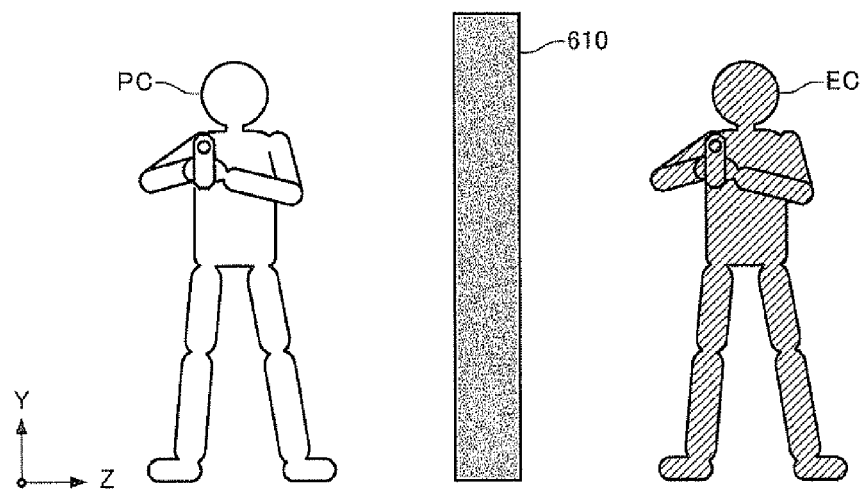
Figure 15C:
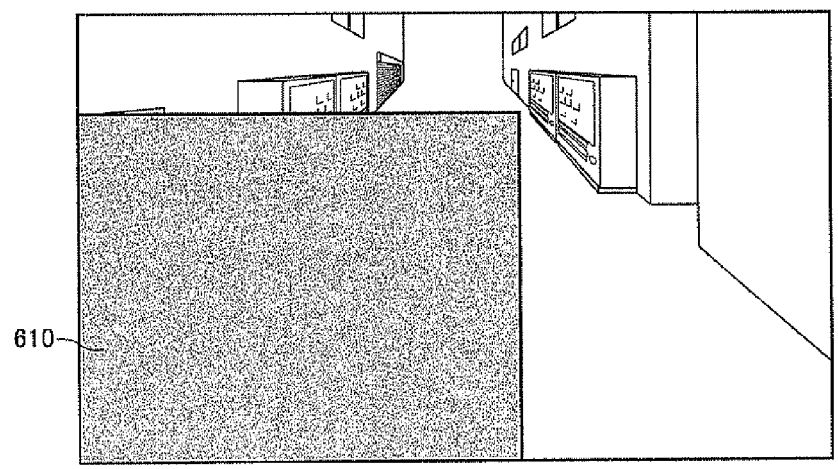

FIGS. 15A to 15C are diagrams illustrating the positional relationship (XZ plane or YZ plane) between the player character set in the special state (particularly the hiding state), a wall, and an enemy character. As illustrated in FIGS. 15A and 15B, when a wall 610 is present between the player character PC and the enemy character EC, the enemy character EC is hidden behind the wall 610 in a first-person viewpoint image (see FIG. 15C).

Figure 19A:
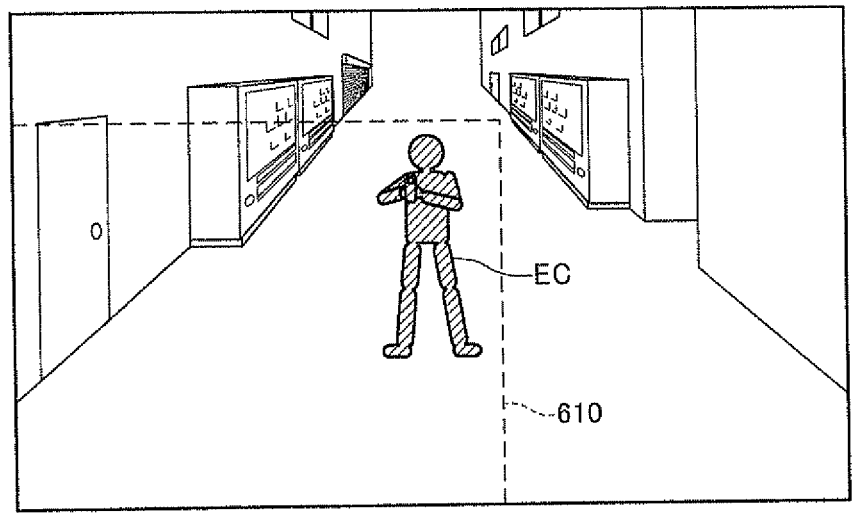
FIGS. 19A and 19B are diagrams illustrating display control in a special state (particularly a hiding state).
Figure 19B:
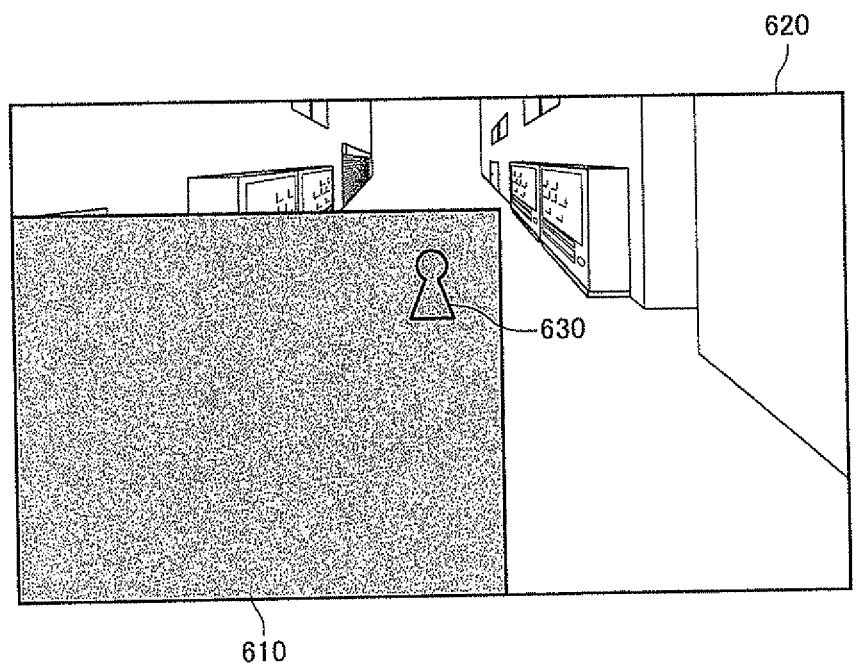

FIGS. 19A and 19B are diagrams illustrating display control in the special state (particularly the hiding state).

As illustrated in FIG. 19A, an object (wall object 610) that blocks the view of the player character may be displayed in a translucent state in the special state (particularly the hiding state). Therefore, the player can observe the enemy object EC across the wall, and can easily attack the enemy abject EC in the special state.

The object 610 that is displayed in a translucent state in the special state may be designated in advance. For example, a stationary object that is positioned around the special point and is likely to block the view of the player may be selected and registered corresponding to the special point when creating a topographical model. When the player character has been set in the special state, the stationary object registered corresponding to the special point may be displayed in a translucent state. An object that blocks the view of the player character positioned at the special point may be calculated in real time based on the positional relationship between the line-of-sight direction or the field-of-view range of the player character and the object positioned around the player character. Therefore, the player can observe the enemy object even if the player character is set in the special state, and can enjoy attacking the enemy object in the special state. An object may be displayed in a translucent state only when the player character is set in the hiding state of the special state.

As illustrated in FIG. 19B, a notification image 630 that indicates the presence of the enemy character EC may be blended with an image 620 of the virtual space. The position of the notification image 630 relative to the image 620 of the virtual space may be determined based on the projection position of the enemy character EC in the screen plane.

The notification image that indicates the enemy character EC may be an image that indicates the contour of the enemy character EC, a mark image corresponding to the enemy character EC, or a life gauge image of the enemy character EC, for example.

(8) Cancellation of Special State

The special state is canceled based on an operation performed by the player. For example, when at least one of the position and the direction of the player character (virtual camera) has changed based on the input information, and satisfied a special state cancellation condition, the player character may be caused to transition from the special state to the normal state.

When controlling the position and the direction of the virtual camera instead of the position and the direction of the player character, or the position and the direction of the player character are synchronized with the position and the direction of the virtual camera, the player character may be caused to transition from the special state to the normal state when at least one of the position and the direction of the virtual camera does not satisfy a special state continuance condition.

Alternatively, whether or not the special state cancellation condition has been satisfied may be determined based on at least one of the time elapsed after the player character has transitioned to the special state and a predetermined parameter of the player character, and the player character may be caused to transition from the special state to the normal state when it has been determined that the special state cancellation condition has been satisfied.

Figure 9:
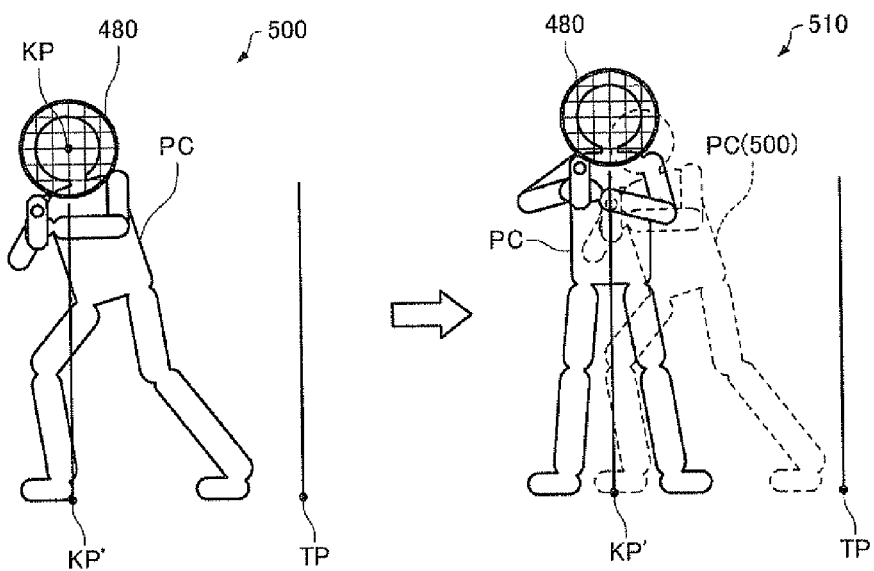
FIG. 9 is a diagram illustrating control of the movement of a player character when the player character transitions from a special state to a normal state.

FIG. 9 is a diagram illustrating control of the movement of the player character when the player character transitions from the special state to the normal state.

When the player character CP is set in a special state 500, the position of the player character CP in the world coordinate system is the special point TP. The position of the player character CP differs to some extent from the special point TP depending on the motion of the player character CP. The virtual camera 480 is set at the special state camera position (virtual camera position information (hiding state) set corresponding to the attack pattern at the special point) KP.

When the special state has been canceled, the player character CP moves to a position KP' right under the position KP of the virtual camera (see 510). Specifically, the position of the player character moves based on the position KP of the virtual camera instead of the special point TP when the special state has been canceled.

This makes it possible to implement smooth virtual camera switch control when the player character returns to the normal state from the special state.

Figure 10A:
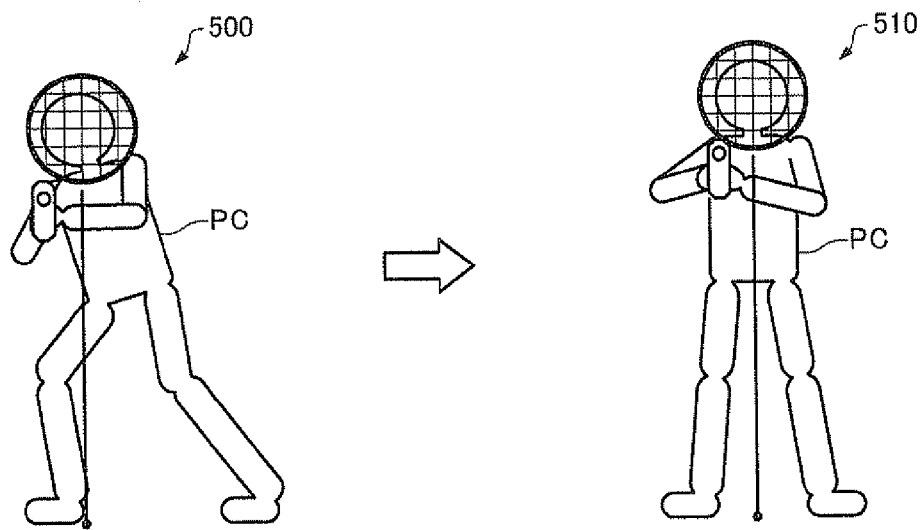
FIGS. 10A and 10B are diagrams illustrating control of the movement of a player character when the player character transitions from a special state to a normal state.
Figure 10B:
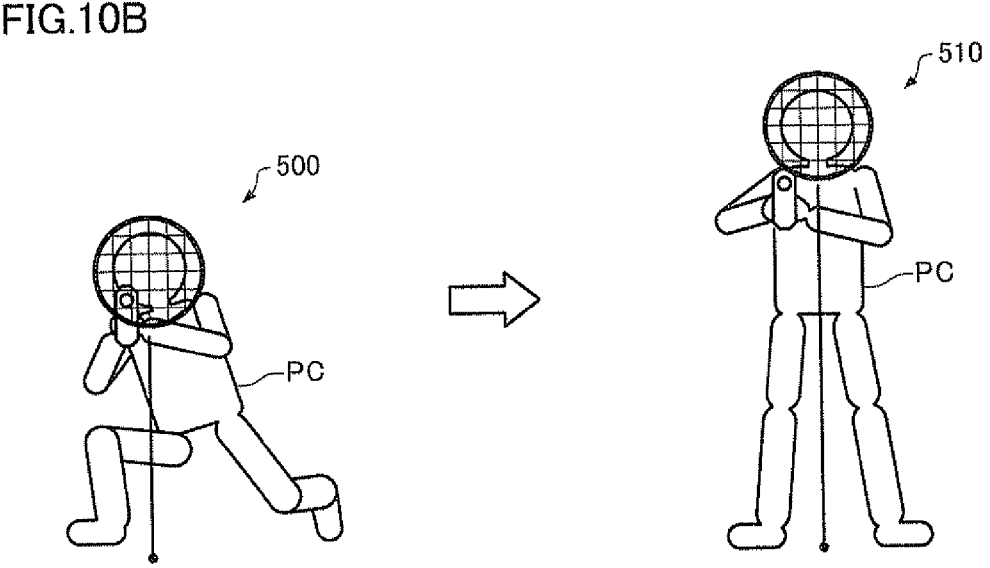

FIGS. 10A and 10B are diagrams illustrating control of the movement of the player character when the player character transitions from the special state to the normal state.

As illustrated in FIG. 10A, when the player character PC set in the special state 500 has been set in the upright hiding state, the player character PC that has transitioned to the normal state 510 is set in the standing state.

As illustrated in FIG. 10B, when the player character PC set in the special state 500 has been set in the crouch hiding state, the player character PC that has transitioned to the normal state 510 is set in the standing state instead of the crouch state.

Figure 11:
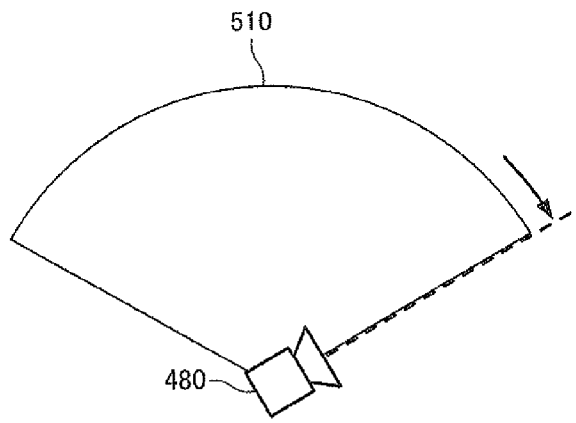
FIG. 11 is a diagram illustrating a limitation to a camera rotation range in a special state.

FIG. 11 is a diagram illustrating a limitation to the camera rotation range in the special state.

In this embodiment, when the player character is positioned at the special point, the player can change the direction of the player character (virtual camera) using the operation section.

The special state is canceled when the direction of the player character (virtual camera 480) has exceeded an allowable range 510 (may be the same as the allowable direction range 220 in FIG. 2) that is set based on the direction condition (direction condition 313 when determining a transition to the special state). However, whether or not the allowable range 510 has been exceeded cannot be determined if the direction of the player character (virtual camera 480) is controlled in the same manner as in the normal state. Therefore, when the player has performed an operation input that changes the direction of the player character (virtual camera) in the special state, the rotation speed of the virtual camera may be reduced as compared with the case where the player has performed an operation input that changes the direction of the player character (virtual camera) in the normal state.

The rotation speed of the virtual camera may be reduced (i.e., the direction of the virtual camera 480 is not easily changed) when the direction of the virtual camera 480 has exceeded a predetermined range, or is likely to exceed a predetermined range.

The player can thus be notified that the player is changing the direction of the virtual camera 480 so that the special state cancellation condition is satisfied. Moreover, a situation in which the direction of the virtual camera 480 rapidly changes can be prevented.

(9) Online Game Control

This embodiment may be applied to an online game in which a game machine transmits game data to and receives game data from another game machine connected via a network, or transmits game data to and receives game data from a server that is connected to another game machine.

Figure 20A:
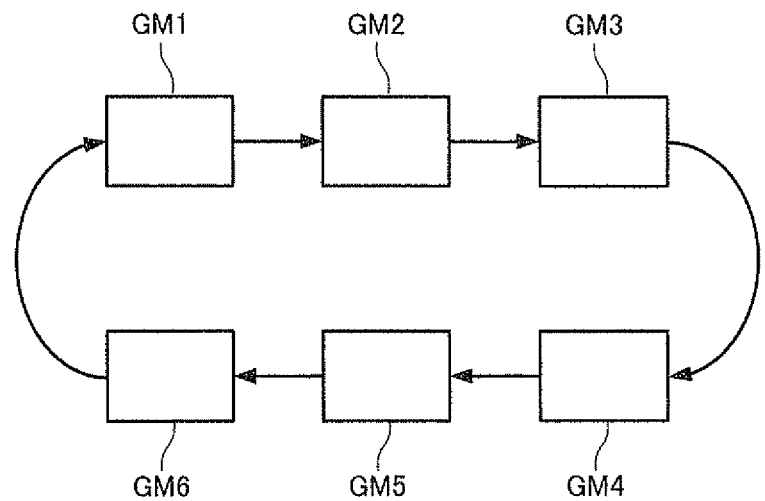
FIGS. 20A and 20B are diagrams illustrating the configuration of an online game system.
Figure 20B:
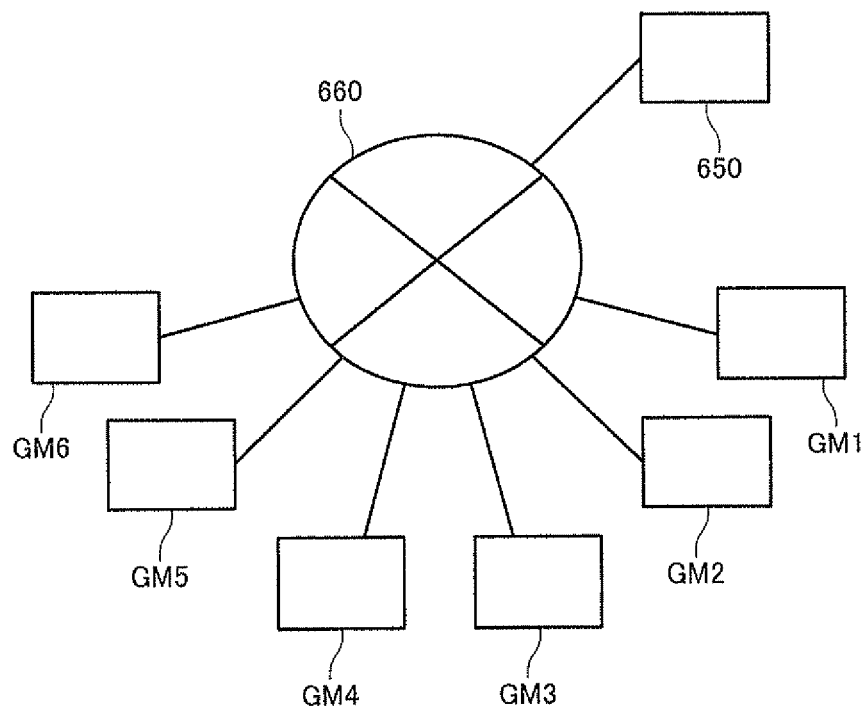

FIGS. 20A and 20B are diagrams illustrating the configuration of an online game system. As illustrated in FIG. 20A, a plurality of game machines GM1 to GM6 connected via a peer-to-peer network may exchange game data, and perform game calculations based on the game data included in each game machine and the game data received from another game machine.

The game machines GM1 to GM6 may perform wireless radio communication using Bluetooth or the like.

When the game machines GM1 to GM6 have a wireless LAN function, and conform to the IEEE 802.11 standard (e.g., IEEE 802 11b), the game machines GM1 to GM6 may exchange game data by broadcast, unicast, or multicast packet communication (data communication). The game machines GM1 to GM6 may exchange game data by unicast packet communication when the opposing player can be specified.

The term "unicast" refers to a communication method that designates a single network address within the communication area, and transmits data (packet including data) to a specific node. The term "multicast" refers to a communication method that designates the network addresses of a plurality of nodes within the communication area, and transmits identical data (packet including data) to the plurality of nodes.

As illustrated in FIG. 20B, a plurality of game machines GM1 to GM6 and a server 650 may be connected via a network 660, and may exchange game data via the server 650.

The game data communication processing section of each game machine transmits game data to and receives game data from another game machine connected via the network 660, or transmits game data to and receives game data from the server 650 connected to another game machine.

Figure 21:
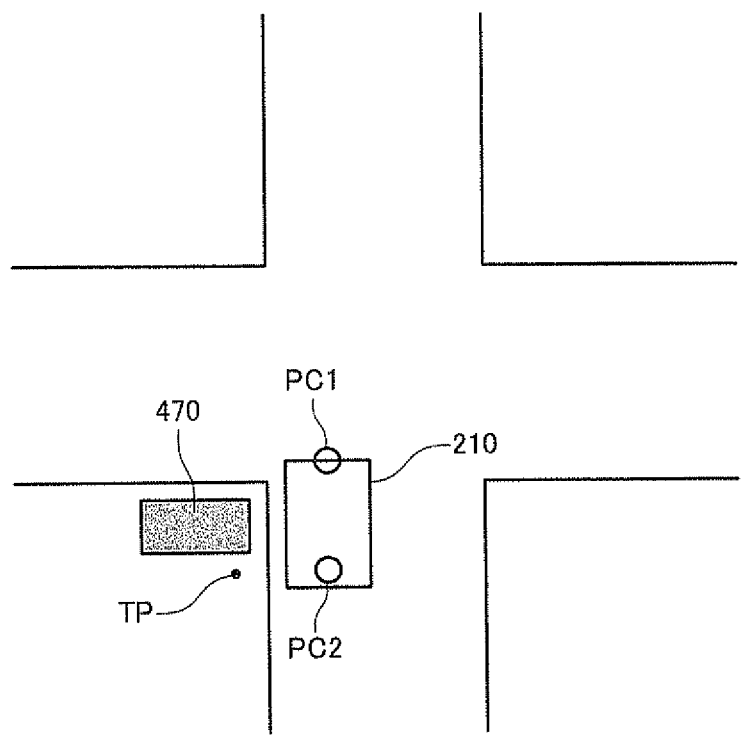
FIG. 21 is a diagram illustrating a state in which player characters of a plurality of players are present in a virtual space.

When implementing the online game, player characters of a plurality of players are present in the virtual space. As illustrated in FIG. 21, a player character PC1 of the first player and a player character PC2 of the second player may be positioned near a special point TP1, and may satisfy the special state transition condition for the special point TP1 (e.g., when the player character PC1 and the player character PC2 come in contact with a collision area 210 corresponding to the special point TP1), for example. However, only one player character can be positioned at the special point TP1. In this case, one of the player character PC1 and the player character PC2 that has satisfied the special state transition condition earlier than the other player character may be moved to the special point TP1.

For example, when the player character PC1 of the first player has satisfied the special state transition condition earlier than the player character PC2 of the second player, the player character PC1 of the first player can move to the special point TP1, but the player character PC2 of the second player cannot move to the special point TP1.

In order to allow only one player character to be positioned at the special point, it is necessary to obtain game data from another game machine (e.g., game data that indicates the player character of the other game machine has satisfied the special state transition condition for the special point TP1).

When implementing the online game, however, since the game machine receives game data from another game machine (e.g., game data that indicates the player character of the other game machine has satisfied the special state transition condition for the special point TP1) via a network, a communication delay occurs. For example, when the communication delay is alpha seconds, the game machine can acquire game data from another game machine with a delay of alpha seconds.

Therefore, when allowing only one player character to be positioned at the special point while reflecting game data received from another game machine, the player character PC1 of the first player cannot move to the special point until alpha seconds elapses, so that the player may feel inconsistency.

In this embodiment, when the game data of the player character included in the game machine satisfies the special state transition condition for the special point TP1, the player character is moved to the special point TP1. When the player character PC1 of the first player and the player character PC2 of the second player have almost simultaneously satisfied the special state transition condition, each game machine moves the player character to the special point TP1.

In the example illustrated in FIG. 21, both the player character PC1 of the first player and the player character PC2 of the second player move to the special point. An arbitration process for exclusive control is performed when data about a plurality of players who participate in the online game at a given time have been acquired.

The arbitration process includes comparing the occurrence times of an event (i.e., the player character has satisfied the special state transition condition for the special point TP1), and moving the player character that has satisfied the special state transition condition later than the other player character to the special point.

Figure 23:
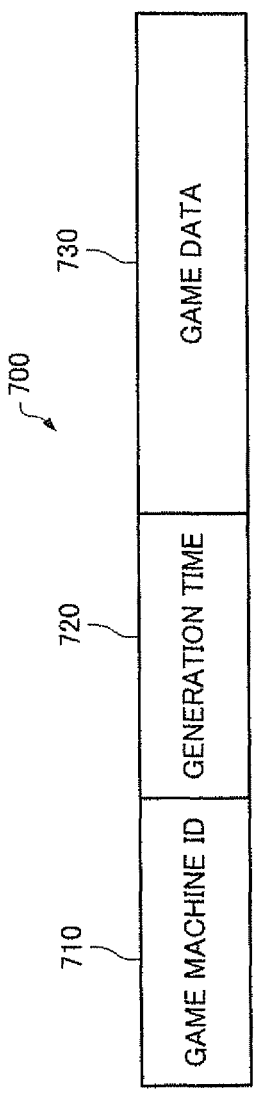
FIG. 23 is a diagram illustrating communication data transmitted between game machines.

FIG. 23 is a diagram illustrating communication data exchanged between the game machines. Communication data 700 includes game data 730, a game machine ID 710 that indicates the game machine that has generated the game data, and a game data generation time 720. The game data 730 is information necessary for generating an image (game result), sound, and result data. The game data 730 may be information (e.g., input information or event information) necessary for each game machine to perform game calculations, or may be information (position information, hit information, result information, or parameter information) generated as a result of game calculations performed by an arbitrary game machine or the server.

FIG. 22 is a diagram illustrating generation and transmission/reception of the game data during the online game. Specifically, the online game is performed between a first game machine GM1 (first player character PC1) and a second game machine GM2 (second player character PC2). The first game machine GM1 (first player character PC1) has generated game data a1 (game data that indicates that the first player character PC1 has satisfied the special state transition condition for the special point TP1) at a time t1, and the second game machine GM2 (second player character PC2) has generated game data b1 (game data that indicates that the second player character PC2 has satisfied the special state transition condition for the special point TP1) at a time t2 (t1<t2).

When the communication delay is indicated by alpha, when the first game machine GM1 has generated the game data a1 at the time t1, and the corresponding game data a1' has been transmitted to the second game machine GM2, the second game machine GM2 receives the game data a1' at a time t3. Likewise, when the second game machine GM2 has generated the game data b1 at the time t2, and the corresponding game data b1' has been transmitted to the first game machine GM1, the first game machine GM1 receives the game data b1' at a time t4.

When each game machine independently performs game calculations using an identical algorithm based on the game data generated by each game machine and the game data received from another game machine, the first game machine GM1 moves the first player character PC1 to the special point TP at the time t1 based on the game data a1 generated by the first game machine GM1. The second game machine GM2 moves the second player character PC2 to the special point TP at the time t2 based on the game data b1 generated by the second game machine GM2.

The second game machine GM2 receives the game data a1' at the time t3. The game data a1' indicates an event (ev1) in which the first player character PC1 has satisfied the special state transition condition for the special point TP in the game machine GM1 at the time t1. The game data b1 indicates an event (ev2) in which the second player character PC2 has satisfied the special state transition condition for the special point TP in the game machine GM2 at the time t2. The event ev1 and the event ev2 can occur at the same time. In this case, since the event ev1 has occurred earlier than the event ev2, the event ev1 is given priority (e.g., the event ev2 is canceled). For example, the second game machine GM2 moves the second player character from the special point TP to another point at the time t3. Specifically, the first player character PC1 and the second player character PC2 move to the special point TP when the first player character PC1 and the second player character PC2 have satisfied the special state transition condition. The second player PC2 that has moved to the special point TP later than the first player character PC1 is then moved from the special point, and the first player character remains at the special point TP.

This makes it possible to smoothly move the player character to the special point regardless of a communication data delay, so that a game that is consistent with the operation of the player can be provided.

Whether or not events that cannot occur at the same time have occurred may be determined by each game machine based on special state transition information about the player character of the game machine and special state transition information about the player character of another game machine. Alternatively, whether or not events that cannot occur at the same time have occurred may be determined by the host machine or the server, and each game machine may receive the determination result from the host machine or the server.

Note that a plurality of special points may be grouped, and the above control may be performed for each group.

Figure 24:
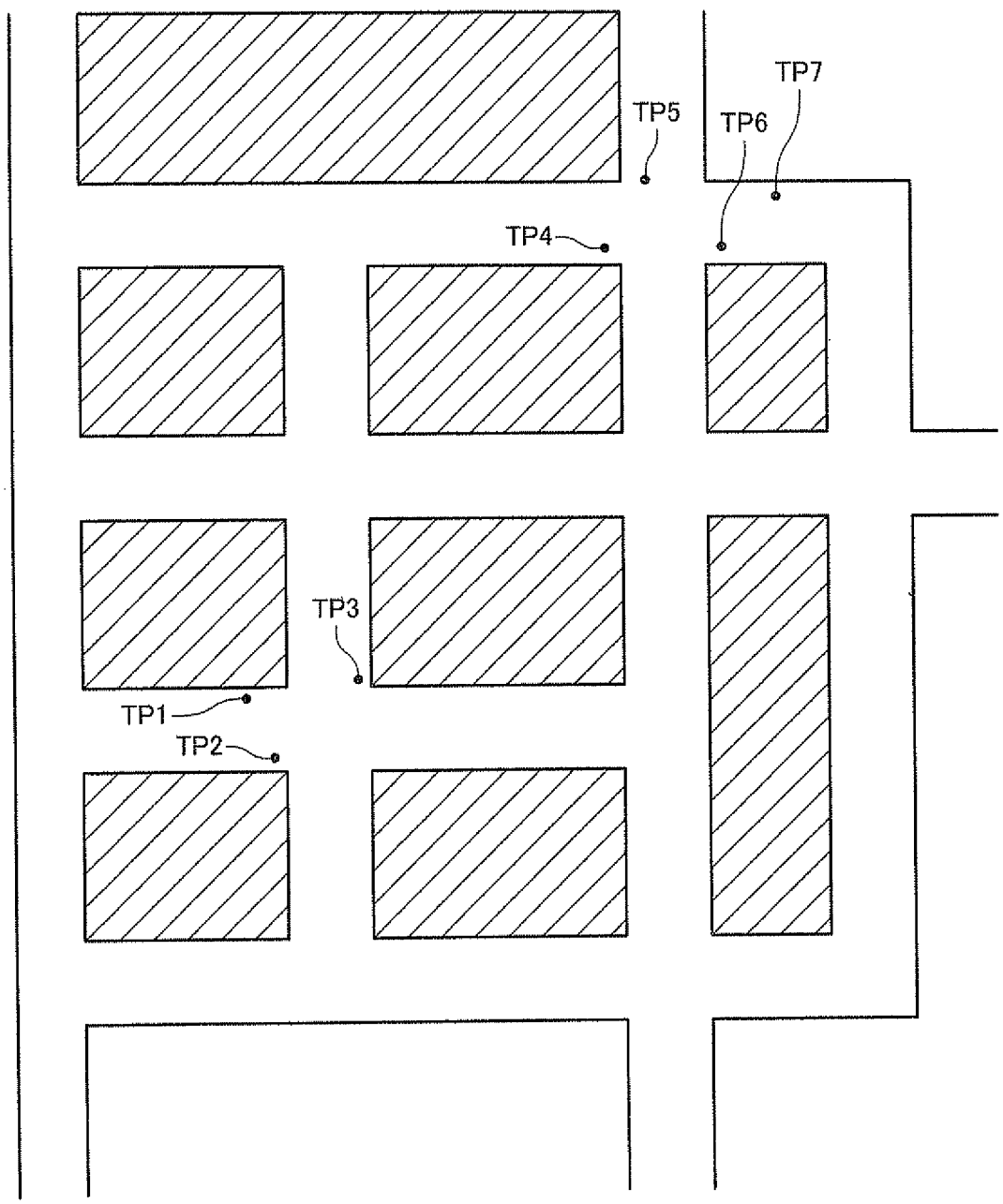
FIG. 24 is a diagram illustrating a state in which a plurality of special points TP1 to TP7 are set in a virtual space.

FIG. 24 is a diagram illustrating a state in which a plurality of special points TP1 to TP7 are set in the virtual space.

The special points TP1 to TP3 belong to a first group that specifies special points that are subjected to exclusive control. Since the special points belonging to the first group are subjected to exclusive control, the player character can be moved to only one of the special points belonging to the first group at a given time. For example, when the first player character PC1 belonging to the first group has satisfied the special state transition condition for the special point TP1, the first player character PC1 can be moved to the special point TP1 when another player character is not positioned at the special points TP1 to TP3 belonging to the first group. For example, when another player character is positioned at the special point TP2 that belongs to the first group, the first player character PC1 cannot move to the special point TP1.

A plurality of adjacent special points may be grouped for exclusive control. The player character positioned at the special point is switched between the attack state and the hiding state, and makes an attack motion. Specifically, when the player character is positioned at the special point, the player character makes an attack/defense motion by putting out part of the body from the wall or the like or hiding itself behind the wall or the like. Therefore, if a plurality of player characters are positioned at adjacent special points, the attack/defense motion of one player character may hinder the attack/defense motion of another player character. Accordingly, such special points (e.g., special points present at a distance equal to or less than a specific distance) may be grouped for exclusive control.

The special points TP4 to TP7 belong to a second group that specifies special points that are subjected to substitution control. The special points belonging to the second group are subjected to substitution control. Specifically, when the player character PC1 has satisfied the special state transition condition for the special point TP4 belonging to the second group at a given time, and another player character has been positioned at the special point TP4, the player character PC1 can be moved to another special point (special point where no player character is positioned) that belongs to the second group.

For example, a plurality of adjacent special points may be grouped for substitution control. In this case, when a plurality of player characters have satisfied the special state transition condition for a given special point, the player character that has satisfied the special state transition condition earlier than the other player character may be moved to the given special point, and the player character that has satisfied the special state transition condition later than the other player character may be moved to a special point other than the given special point.

3. Process

Figure 26:
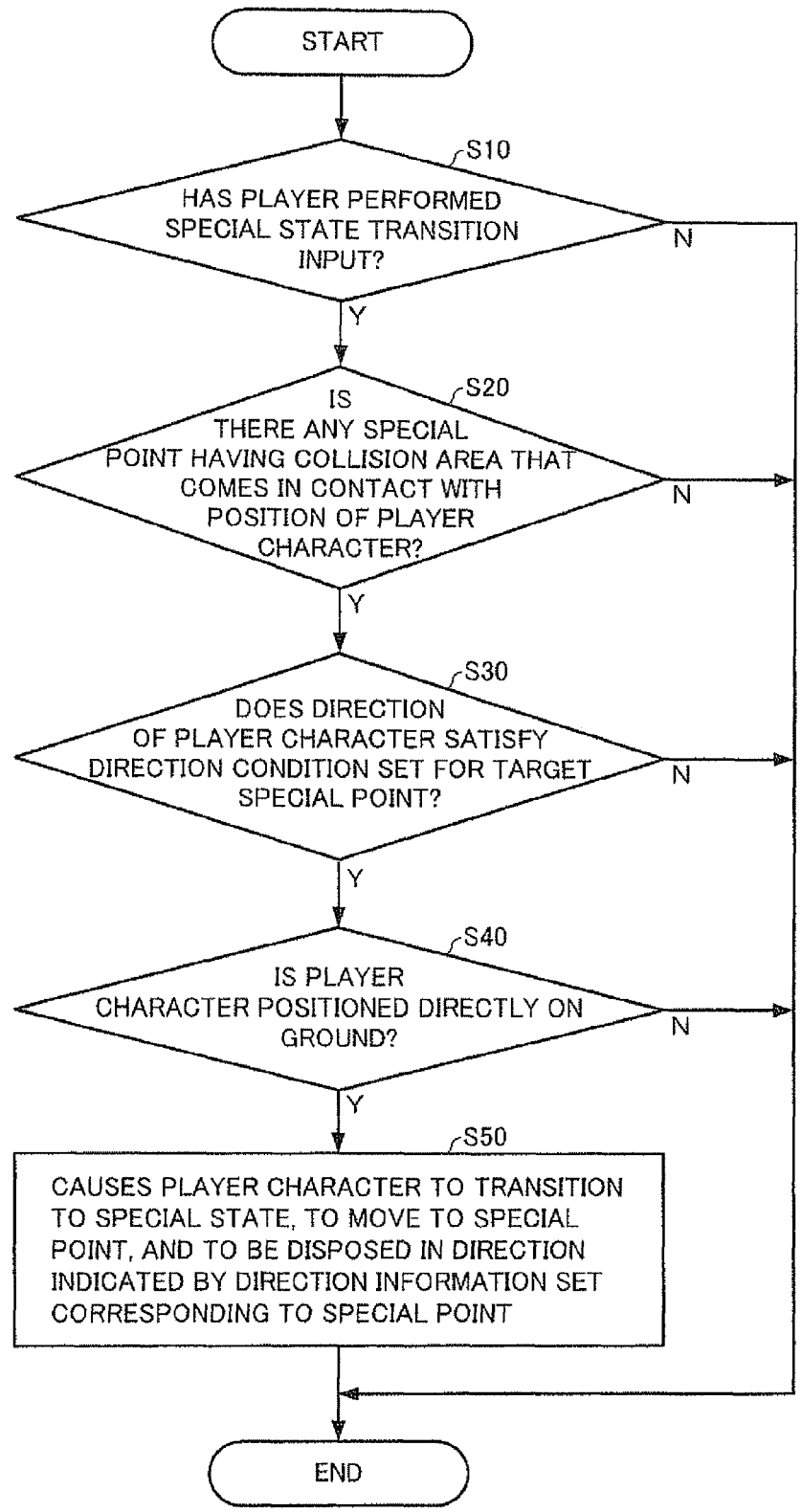
FIG. 26 is a flowchart illustrating the flow of a special state transition control process according to one embodiment of the invention.

FIG. 26 is a flowchart illustrating the flow of a special state transition control process according to this embodiment. The following process is performed when the player has performed a special state transition input (step S10). Specifically, whether or not each special point has a collision area that comes in contact with the position of the player character is determined (step S20). When it has been determined that one of the special points has a collision area that comes in contact with the position of the player character, whether or not the direction of the player character satisfies the direction condition set for the target special point is determined (step S30). When the direction of the player character satisfies the direction condition, whether or not the player character is positioned directly on the ground is determined (step S40). When the player character is positioned directly on the ground, the player character is caused to transition to the special state, moved to the special point, and disposed in the direction indicated by the direction information set corresponding to the special point (step S50).

Note that the invention is not limited to the above embodiments. Various modifications and variations may be made. Any term cited with a different term having a broader meaning or the same meaning at least once in the specification and the drawings may be replaced by the different term in any place in the specification and the drawings.

The above embodiments have been described taking an example in which the game machine is an imaging device. Note that the game machine is not limited thereto. For example, the invention may be applied to an arcade game system, a consumer game system, or a portable game system. The invention may be applied to various games such as a shooting game, a racing game, a role-playing game, and a puzzle game.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

For example, the direction, the gun sight, and the like of the gun-type controller may be calculated based on the input information (e.g., gun sight position instruction input information; information about the indication position in the captured image when the input section includes an imaging section), from the input section (e.g., gun-type controller), and whether or not the special state transition condition has been satisfied may be determined based on the direction and the gun sight of the gun-type controller or the like. For example, it may be determined that the special state transition condition has been satisfied when the direction of the gun-type controller or the like does not coincide with the direction of the display section (e.g., a monitor that displays the game image), or the gun sight is not positioned within the display section (e.g., a monitor that displays the game image). In this case, the player character can be moved to the special point in the virtual space when the player does not aim at the enemy character, and cannot be moved to the special point in the virtual space when the player aims at the enemy character.

What is claimed is:

1. A non-transitory computer-readable information storage medium storing a program that generates an image of a game that moves a player character in a virtual space, the program causing a computer to function as:

a movement information calculation section that calculates movement information about the player character in the virtual space based on input information;

a special state transition section that determines whether the player character has satisfied a special state transition condition based on the movement information about the player character, and causes the player character to transition to a special state and move to a special point set in the virtual space when the special state transition section has determined that the player character has satisfied the special state transition condition;

a virtual camera control section that disposes a virtual camera based on at least one of the input information and the movement information about the player character;

an image generation section that generates an image of the virtual space viewed from the virtual camera; and an attack calculation section that determines an attack start position, and calculates a trajectory of a missile from the attack start position;

the movement information calculation section calculating a position of the player character based on the input information;

the special state transition section determining the position of the player character based on the position of the player character and a position determination condition that is set corresponding to the special point in the virtual space, and determining whether the player character has satisfied the special state transition condition based on the determination result; and the virtual camera control section causing setting of at least one of: (a) a distance between the player character and the virtual camera, (b) a positional relationship between the player character and the virtual camera, (c) a direction of the virtual camera relative to the player character, and (d) an angle of view of the virtual camera when the player character is in the special state to differ from setting when the player character is not in the special state;

the virtual camera control section causing changing of at least one of (i) the distance between the player character and the virtual camera, and (ii) the positional relationship between the player character and the virtual camera when the player character is in an attack state of the special state, when the player character is not in a normal state; and the attack calculation section determining the attack start position based on the position of the player character in the normal state, and determining the attack start position based on the position of the virtual camera in the attack state of the special state.

2. The information storage medium according to claim 1, wherein the special state transition section switches the state of the player character between a hiding state and an attack state based on the input information when the player character is in the special state; and wherein the virtual camera control section causes setting of at least one of: (a) the distance between the player character and the virtual camera, (b) the positional relationship between the player character and the virtual camera, (c) the direction of the virtual camera relative to the player character, and (d) the angle of view of the virtual camera when the player character is in the attack state to differ from setting when the player character is in the hiding state.

3. The information storage medium according to claim 1, wherein the virtual camera control section changes at least one of: (a) the distance between the player character and the virtual camera, (b) the positional relationship between the player character and the virtual camera, (c) the direction of the virtual camera relative to the player character, and (d) the angle of view of the virtual camera based on at least one of: (i) an attribute, (ii) a posture, (iii) a motion type used for motion control, and (iv) an item type of the player character when the player character is in the special state or the attack state of the special state.

4. The information storage medium according to claim 1, wherein the special state transition section sets a parameter used for game calculations to a value advantageous or disadvantageous for the player character when the player character is in the special state, as compared with a case where the player character is not in the special state.

5. The information storage medium according to claim 1, wherein the movement information calculation section calculates a posture of the player character or whether the player character is positioned directly on the ground, based on at least one of the input information and posture information; and wherein the special state transition section determines whether the player character has satisfied the special state transition condition based on the posture of the player character or whether the player character is positioned directly on the ground.

6. The information storage medium according to claim 1, wherein the special state transition section generates drawing control information for drawing an object that blocks the view of the player character in a translucent state when the player character is in the special state; and wherein the image generation section generates an image of the virtual space in which an object that blocks the view of the player character is displayed in a translucent state based on the drawing control information.

7. The information storage medium according to claim 1, wherein the special state transition section generates image generation control information for generating an image in which a notification image that indicates the presence of a predetermined object is disposed in the image of the virtual space at a position corresponding to the object; and wherein the image generation section blends the image of the virtual space with the notification image based on the image generation control information to generate the image of the virtual space including the notification image.

8. The information storage medium according to claim 1, wherein the special state transition section determines a special point to which the player character is moved based on a distance between the player character and each of a plurality of special points when the player character has satisfied the special state transition condition for a plurality of special points in the virtual space.

9. The information storage medium according to claim 1, wherein the special state transition section determines whether the player character has satisfied the special state transition condition based on at least one of: (a) a determination result as to whether the position of the player character has continuously satisfied a position condition for a predetermined time, (b) a determination result as to whether a direction of the player character has continuously satisfied a direction condition for a predetermined time, and (c) a determination result as to whether or not a moving direction of the player character has continuously satisfied a moving direction condition for a predetermined time.

10. The information storage medium according to claim 1, wherein the special state transition section cancels the special state of the player character when at least one of the position and a direction of the player character has changed based on the input information, and satisfied a special state cancellation condition.

11. The information storage medium according to claim 1, wherein the special state transition section determines whether at least one of a time elapsed after the player character has transitioned to the special state and a predetermined parameter of the player character has satisfied a special state cancellation condition, and cancels the special state of the player character when the special state transition section has determined that the special state cancellation condition has been satisfied.

12. The information storage medium according to claim 1, wherein the virtual camera control section reduces a rotation speed of the virtual camera that is synchronized with the player character when an operation input that changes a direction of the player character has been performed in the special state, as compared with a case where the player character is not in the special state.

13. A non-transitory computer-readable information storage medium storing a program that generates an image of a game that moves a player character in a virtual space, the program causing a computer to function as:
a movement information calculation section that calculates movement information about the player character in the virtual space based on input information;
a special state transition section that determines whether the player character has satisfied a special state transition condition based on the movement information about the player character, and causes the player character to transition to a special state and move to a special point set in the virtual space when the special state transition section has determined that the player character has satisfied the special state transition condition;
a virtual camera control section that disposes a virtual camera based on at least one of the input information and the movement information about the player character;
an image generation section that generates an image of the virtual space viewed from the virtual camera; and
an attack calculation section that determines an attack start position, and calculates a trajectory of a missile from the attack start position;
wherein:
the movement information calculation section calculates a position of the player character based on the input information;
the special state transition section determines the position of the player character based on the position of the player character and a position determination condition that is set corresponding to the special point in the virtual space, and determines whether the player character has satisfied the special state transition condition based on the determination result;
the virtual camera control section sets at least one of: (a) a distance between the player character and the virtual camera, (b) a positional relationship between the player character and the virtual camera, (c) a direction of the virtual camera relative to the player character, and (d) an angle of view of the virtual camera when the player character is in the special state to differ from setting when the player character is not in the special state;
the program is executed by a game machine connected to another game machine or a server via a network, and causes the computer to further function as a game data communication processing section that transmits game data to and receives game data from the other game machine or the server;
the game data communication processing section receives game data including special state transition information about a player character of the other game machine, and transmits game data including special state transition information about the player character of the game machine;
the special state transition section moves the player character of the game machine to a given special point when the player character of the game machine has satisfied the special state transition condition for the given special point, and moves the player character of the game machine that is positioned at the special point to a position other than the special point when the special state transition section has determined that game data special state transition information about the player character of the other game machine and game data special state transition information about the player character of the game machine have an exclusive relationship, and the player character of the game machine has transitioned to the special state later than the player character of the other game machine after the player character of the game machine has moved to the special point;
the virtual camera control section causes changing of at least one of (i) the distance between the player character and the virtual camera, and (ii) the positional relationship between the player character and the virtual camera when the player character is in an attack state of the special state, when the player character is not in a normal state; and
the attack calculation section determines the attack start position based on the position of the player character in the normal state, and determines the attack start position based on the position of the virtual camera in the attack state of the special state.

14. The information storage medium according to claim 13, wherein the special state transition section moves the player character of the game machine to a position other than the special point when the player character of the other game machine and the player character of the game machine have satisfied the special state transition condition for an identical special point, or have satisfied the special state transition condition for special points belonging to an identical group, or have satisfied the special state transition condition for special points having an exclusion relationship.

15. The information storage medium according to claim 13, wherein the special state transition section moves the player character of the game machine to a substitution special point set corresponding to the special point at which the player character of the game machine is positioned, and causes the player character of the game machine to transition from a normal state to the special state when the player character of the other game machine and the player character of the game machine have an exclusive relationship, and the player character of the game machine has transitioned to the special state later than the player character of the other game machine.

16. An image generation device that generates an image of a game that moves a player character in a virtual space, the image generation device comprising:

a movement information calculation section that calculates movement information about the player character in the virtual space based on input information;

a special state transition section that determines whether the player character has satisfied a special state transition condition based on the movement information about the player character, and causes the player character to transition to a special state and move to a special point set in the virtual space when the special state transition section has determined that the player character has satisfied the special state transition condition;

a virtual camera control section that disposes a virtual camera based on at least one of the input information and the movement information about the player character;

an image generation section that generates an image of the virtual space viewed from the virtual camera; and an attack calculation section that determines an attack start position, and calculates a trajectory of a missile from the attack start position, the movement information calculation section calculating a position of the player character based on the input information;

the special state transition section determining the position of the player character based on the position of the player character and a position determination condition that is set corresponding to the special point in the virtual space, and determining whether or not the player character has satisfied the special state transition condition based on the determination result;

the virtual camera control section causing setting of at least one of one of: (a) a distance between the player character and the virtual camera, (b) a positional relationship between the player character and the virtual camera, (c) a direction of the virtual camera relative to the player character, and (d) an angle of view of the virtual camera when the player character is in the special state to differ from setting when the player character is not in the special state;

the virtual camera control section causing changing of at least one of (i) the distance between the player character and the virtual camera, and (ii) the positional relationship between the player character and the virtual camera when the player character is in an attack state of the special state, when the player character is not in a normal state; and the attack calculation section determining the attack start position based on the position of the player character in the normal state, and determining the attack start position based on the position of the virtual camera in the attack state of the special state.

17. An image generation device that generates an image of a game that moves a player character in a virtual space, the image generation device comprising:

a movement information calculation section that calculates movement information about the player character in the virtual space based on input information;

a special state transition section that determines whether the player character has satisfied a special state transition condition based on the movement information about the player character, and causes the player character to transition to a special state and move to a special point set in the virtual space when the special state transition section has determined that the player character has satisfied the special state transition condition;

a virtual camera control section that disposes a virtual camera based on at least one of the input information and the movement information about the player character;

an image generation section that generates an image of the virtual space viewed from the virtual camera;

an attack calculation section that determines an attack start position, and calculates a trajectory of a missile from the attack start position, wherein:

the movement information calculation section calculates a position of the player character based on the input information;

the special state transition section determines the position of the player character based on the position of the player character and a position determination condition that is set corresponding to the special point in the virtual space, and determines whether the player character has satisfied the special state transition condition based on the determination result;

the virtual camera control section causes setting of at least one of: (a) a distance between the player character and the virtual camera, (b) a positional relationship between the player character and the virtual camera, (c) a direction of the virtual camera relative to the player character, and (d) an angle of view of the virtual camera when the player character is in the special state to differ from setting when the player character is not in the special state;

the program is executed by a game machine connected to another game machine or a server via a network, and causes the computer to further function as a game data communication processing section that transmits game data to and receives game data from the other game machine or the server;

the game data communication processing section receives game data including special state transition information about a player character of the other game machine, and transmits game data including special state transition information about the player character of the game machine;

the special state transition section moves the player character of the game machine to a given special point when the player character of the game machine has satisfied the special state transition condition for the given special point, and moves the player character of the game machine that is positioned at the special point to a position other than the special point when the special state transition section has determined that game data special state transition information about the player character of the other game machine and game data special state transition information about the player character of the game machine have an exclusive relationship, and the player character of the game machine has transitioned to the special state later than the player character of the other game machine after the player character of the game machine has moved to the special point;

the virtual camera control section causes changing of at least one of (i) the distance between the player character and the virtual camera, and (ii) the positional relationship between the player character and the virtual camera when the player character is in an attack state of the special state, when the player character is not in a normal state; and the attack calculation section determines the attack start position based on the position of the player character in the normal state, and determines the attack start position based on the position of the virtual camera in the attack state of the special state.

\* \* \* \* \*